(12) United States Patent
Shimoshikiryo

(10) Patent No.: US 6,356,325 B1
(45) Date of Patent: Mar. 12, 2002

(54) LCD WITH COMPENSATORS IN THE INCLINED DIRECTION

(75) Inventor: Fumikazu Shimoshikiryo, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/019,256

(22) Filed: Feb. 5, 1998

(30) Foreign Application Priority Data

Feb. 5, 1997 (JP) .............................................. 9-023044
Feb. 3, 1998 (JP) ........................................... 10-022398

(51) Int. Cl.[7] .......................................... G02F 1/1335
(52) U.S. Cl. ........................ 349/121; 349/118; 349/120
(58) Field of Search ................................ 349/119, 121, 349/130, 178

(56) References Cited

U.S. PATENT DOCUMENTS

| | | | |
|---|---|---|---|
| 5,184,236 A | 2/1993 | Miyashita et al. | 359/63 |
| 5,227,903 A | 7/1993 | Miyazawa et al. | 359/73 |
| 5,249,071 A | 9/1993 | Yoshimizu et al. | 359/63 |
| 5,311,340 A | 5/1994 | Murata et al. | 359/73 |
| 5,440,413 A | 8/1995 | Kikuchi et al. | 359/73 |
| 5,506,706 A | 4/1996 | Yamahara et al. | 359/73 |
| 5,550,661 A | 8/1996 | Clark et al. | 359/73 |
| 5,699,137 A * | 12/1997 | Kishimoto | 349/121 |
| 5,895,106 A * | 4/1999 | VanderPloeg et al. | 349/121 |
| 5,986,732 A * | 11/1999 | Ozeki et al. | 349/121 |

FOREIGN PATENT DOCUMENTS

| | | |
|---|---|---|
| JP | 5-34675 A | 2/1993 |
| JP | 6-75116 | 3/1994 |
| JP | 7-281176 A | 10/1995 |

* cited by examiner

Primary Examiner—Toan Ton
(74) Attorney, Agent, or Firm—Dike, Bronstein, Roberts & Cushman IP Group; David G. Conlin; David A. Tucker

(57) ABSTRACT

A liquid crystal display device includes: a liquid crystal cell including homeotropic alignment films which are provided on substrates interposing an N-type nematic liquid crystal layer on the liquid crystal layer side; a pair of polarizing plates provided so as to interpose the liquid crystal cell; and a phase difference compensation element provided between at least one of the pair of polarizing plates and the liquid crystal cell, wherein one principal axis of three principal axes of an index ellipsoid of the phase difference compensation element is inclined from a normal to a surface of the liquid crystal cell, and a refractive index along the one principal axis is smaller than a refractive index along another principal axis.

5 Claims, 25 Drawing Sheets

Director axes of liquid crystal molecules in an intermediate portion of a liquid crystal layer Director axes of liquid crystal molecules in an intermediate portion of a liquid crystal layer

PRIOR ART

LCD WITH COMPENSATORS IN THE INCLINED DIRECTION

BACKGROUND OF THE INVENTION

1. Field of the Invention

The present invention relates to a liquid crystal display device used for a computer, a word processor, etc. More specifically, the present invention relates to a liquid crystal display device with an improved display contrast and improved gray scale viewing angle dependence characteristics.

2. Description of the Related Art

As a liquid crystal display mode having outstanding viewing angle characteristics, a method using a liquid crystal cell having a homeotropic alignment film and an N-type nematic liquid crystal is known (Japanese Laid-open Publication No. 7-281176). According to this conventional method, as shown in FIG. 14A, a liquid crystal cell has a structure in which a pair of substrates 7 and 11 are provided so as to interpose a liquid crystal layer 9 made of an N-type nematic liquid crystal. Homeotropic alignment films 8 and 10 are formed on the substrates 7 and 11, respectively, on a liquid crystal layer 9 side, and phase difference compensation films 6 and 12 are provided on both sides of the liquid crystal cell. Alternatively, the phase difference compensation film may be provided only on one side of the liquid crystal cell.

Referring to FIG. 14B, the phase difference compensation films 6 and 12 will be described. Assuming that three principal refractive indices are na, nb, and nc in an orthogonal coordinate system, na=nb>nc, the direction of the principal refractive index na and the direction of the principal refractive index nb are within a plane substantially parallel to the surface of the substrate of the display device, and the direction of the principal refractive index nc is substantially vertical to the surface of the substrate.

Thus, in this liquid crystal display device, a black state can be obtained in every viewing angle direction while no voltage is being applied (i.e., when liquid crystal molecules are aligned substantially vertically to the surfaces of the substrates). In this state, the phase difference compensation film serves to correct the retardation of light output from the liquid crystal layer in any oblique direction.

In the above-mentioned liquid crystal display device, a satisfactory black display is obtained irrespective of an observation direction while no voltage is being applied, and as a result, viewing angle characteristics with an outstanding contrast ratio can be obtained. However, during a gray-scale display, gray scale characteristics are inverted at a predetermined viewing angle (e.g., at a viewing angle of about 10° to about 50°) due to the retardation of the liquid crystal cell and the above-mentioned retardation correction characteristics of the phase difference compensation film.

SUMMARY OF THE INVENTION

A liquid crystal display device of the present invention includes: a liquid crystal cell including homeotropic alignment films which are provided on substrates interposing an N-type nematic liquid crystal layer on the liquid crystal layer side; a pair of polarizing plates provided so as to interpose the liquid crystal cell; and a phase difference compensation element provided between at least one of the pair of polarizing plates and the liquid crystal cell, wherein one principal axis of three principal axes of an index ellipsoid of the phase difference compensation element is inclined from a normal to a surface of the liquid crystal cell, and a refractive index along the one principal axis is smaller than a refractive index along the other principal axes.

In one embodiment of the present invention, the phase difference compensation element includes one phase difference compensation film.

In another embodiment of the present invention, the phase difference compensation element includes a plurality of phase difference compensation films having different optic axis polar angles, and an aggregate optic axis of the layered phase difference compensation films is inclined from the normal to the surface of the phase difference compensation element.

In another embodiment of the present invention, the phase difference compensation element is composed of layered phase difference compensation films including a plurality of phase difference compensation films with different optic axis polar angles and different azimuths, and the optic axes of the entire layered phase difference compensation films are inclined from the normal to the surface of the phase difference compensation element.

In another embodiment of the present invention, the phase difference compensation element is composed of one phase difference compensation film in which an optic axis polar angle is continuously changed, and an aggregate optic axis of the phase difference compensation film is inclined from the normal to the surface of the phase difference compensation element. Furthermore, the phase difference compensation element is composed of one phase difference compensation film in which an optic axis azimuth is continuously changed or one phase difference compensation film in which an optic axis polar angle and an azimuth are continuously changed, and an aggregate optic axis of the phase difference compensation film is inclined from the normal to the surface of the phase difference compensation element.

In another embodiment, in the phase difference compensation element, when a plurality of principal refractive indices of an index ellipsoid are na, nb, and nc, a relationship na=nb>nc is satisfied, at least one of a direction of the principal refractive index na and a direction of the principal refractive index nb is within a plane substantially parallel to the surface of the phase difference compensation element, and a direction of the principal refractive index nc is inclined from the normal to the surface of the phase difference compensation element.

In another embodiment of the present invention, in the phase difference compensation element, when a plurality of the principal refractive indices of an index ellipsoid are na, nb, and nc, relationships na>nc and nb>nc are satisfied, and a direction of the principal refractive index nc is inclined from the normal to the surface of the phase difference compensation element.

In another embodiment of the present invention, the above-mentioned liquid crystal display device further includes a second phase difference compensation element, wherein the one principal axis is inclined from the normal to the surface of the liquid crystal cell whereby the phase difference compensation element has anisotropy of a refractive index within a plane parallel to the surface of the liquid crystal cell, and the second phase difference compensation element cancels the anisotropy of a refractive index of the phase difference compensation element.

In another embodiment of the present invention, one principal axis of three principal axes of an index ellipsoid of the second phase difference compensation element is within a plane parallel to the surface of the liquid crystal cell, and a refractive index along the one principal axis is larger or smaller than refractive indices along the other two principal axes.

In another embodiment of the present invention, the second phase difference compensation element includes at least one phase difference compensation film.

In another embodiment of the present invention, the above-mentioned liquid crystal display device further includes a third phase difference compensation element between at least one of the pair of polarizing plates and the liquid crystal cell, wherein two principal axes of thee principal axes of an index ellipsoid of the third phase difference compensation element is within a plane parallel to the surface of the liquid crystal cell, and a magnitude of refractive indices along the two principal axes is different from each other, and a direction of the principal axis having a larger refractive index of the two principal axes is orthogonal to a direction of an absorption axis of an adjacent polarizing plate.

In another embodiment of the present invention, the third phase difference compensation element includes at least one phase difference compensation film.

Thus, the invention described herein makes possible the advantage of providing a liquid crystal display device having a wide viewing angle range without a gray scale inversion phenomenon in the case of using a liquid crystal cell provided with a homeotropic alignment film and an N-type nematic liquid crystal.

This and other advantages of the present invention will become apparent to those skilled in the art upon reading and understanding the following detailed description with reference to accompanying figures.

BRIEF DESCRIPTION OF THE DRAWINGS

FIG. 1A is a perspective view showing directions of the principal refractive indices of a phase difference compensation element used in the present invention; FIG. 1B is a cross-sectional view showing a cross-sectional structure of the liquid crystal display device; and FIG. 1C is an orthogonal projection view on a plane parallel to the surface of a substrate, showing a rubbing direction of a liquid crystal cell, an optical axis direction of a director of a liquid crystal molecule in an intermediate layer of the liquid crystal cell, a direction of a polarization axis of a polarizing plate, and a direction of an optic axis of a phase difference compensation element.

FIG. 14A is a cross-sectional view of the liquid crystal display device; and FIG. 14B is a perspective view showing the optical characteristics of a phase difference compensating film.

DESCRIPTION OF THE PREFERRED EMBODIMENTS

Hereinafter, the present invention will be described by way of illustrative embodiments with respect to the drawings.

EMBODIMENT 1

Figure 1A:
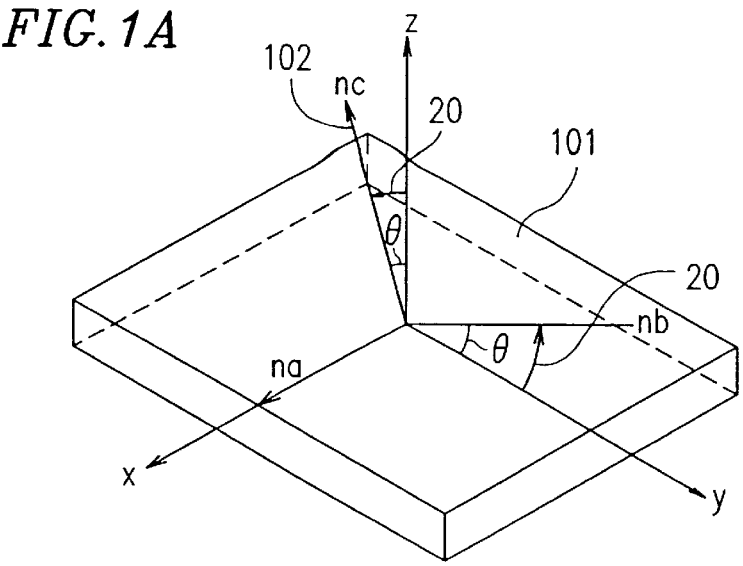
FIGS. 1A, 1B, and 1C show a structure and optical characteristics of a representative liquid crystal display device of the present invention.
Figure 1B:
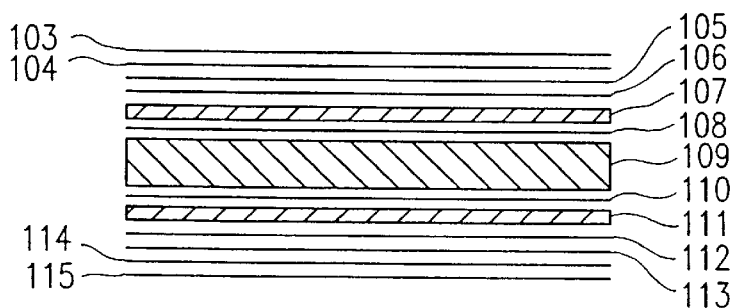

FIG. 1B is a cross-sectional view showing a structure of a liquid crystal display device of Embodiment 1 according to the present invention. The liquid crystal display device includes a liquid crystal cell in which a pair of substrates 107 and 111 are provided so as to interpose a liquid crystal layer 109 made of an N-type nematic liquid crystal and homeotropic alignment films 108 and 110 are formed on the substrates 107 and 111, respectively, on the liquid crystal layer 109 side. A phase difference compensation element composed of three phase difference compensation films 104, 105, and 106 and a phase difference compensation element composed of three phase difference compensation films 112, 113, and 114 are provided so as to interpose the liquid crystal cell therebetween. Lastly, a polarizing plate 103 is provided outside of the three phase difference compensation films 104, 105, and 106, and a polarizing plate 115 is provided outside of the three phase difference compensation films 112, 113, and 114.

Regarding the phase difference compensation films 104, 105, 106, 112, 113, and 114, a polar angle θ of an optic axis nc as shown in FIG. 1A is prescribed to be about 5° in the phase difference compensation films 104 and 114, about 15° in the phase difference compensation films 105 and 113, and about 25° in the phase difference compensation films 106 and 112. Regarding an azimuth (i.e., an angle formed by an optic axis of a phase difference compensation film and a director axis of a liquid crystal molecule in an intermediate layer of the liquid crystal layer as shown in FIG. 1C), α1 which is the azimuth with respect to an optic axis 120 of the phase difference compensation film 104, and β1 which is the azimuth with respect to an optic axis 123 of the phase difference compensation film 114, are prescribed to be about 35°, α2 which is the azimuth with respect to an optic axis 121 of the phase difference compensation film 105, and β2 which is the azimuth with respect to an optic axis 124 of the phase difference compensation film 113, are prescribed to be about 25°, and α3 which is the azimuth with respect to an optic axis 122 of the phase difference compensation film 106, and β3 which is the azimuth with respect to an optic axis 125 of the phase difference compensation film 112, are prescribed to be about 15°.

Figure 3:
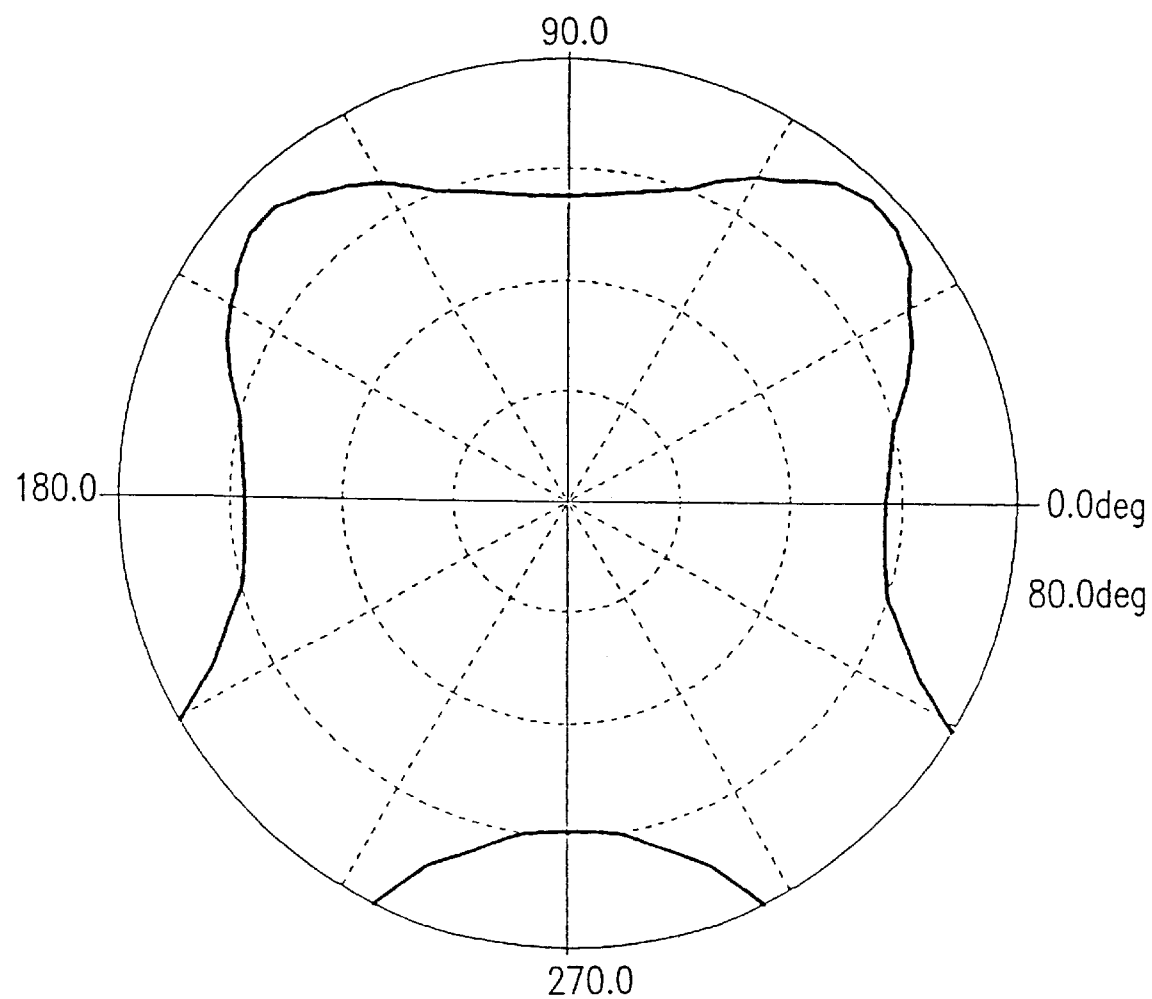
FIG. 3 is a view showing a viewing angle region having a contrast of 10 or more in a liquid crystal display device of Embodiment 1 of the present invention.
Figure 4:
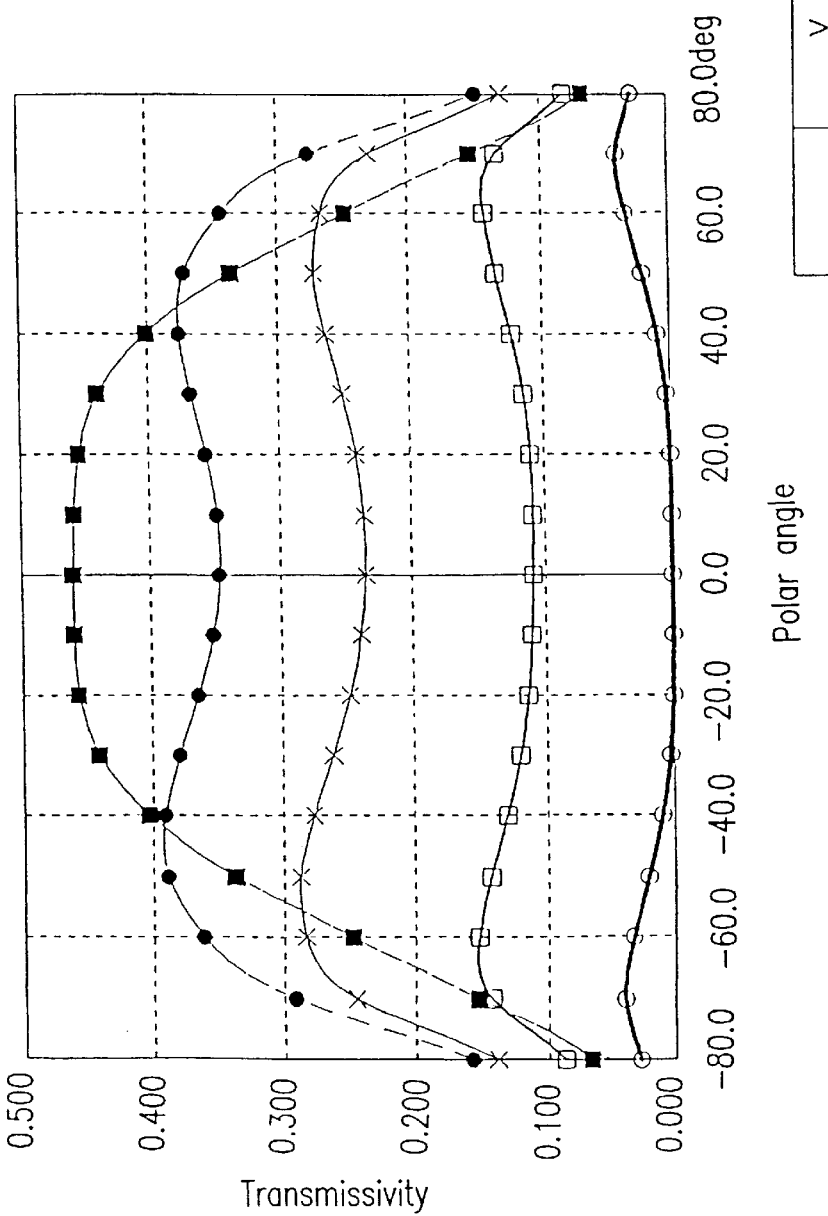
FIG. 4 is a graph showing gray scale characteristics in a right and left direction in 5 gray scales in the liquid crystal display device of Embodiment 1 of the present invention.
Figure 5:
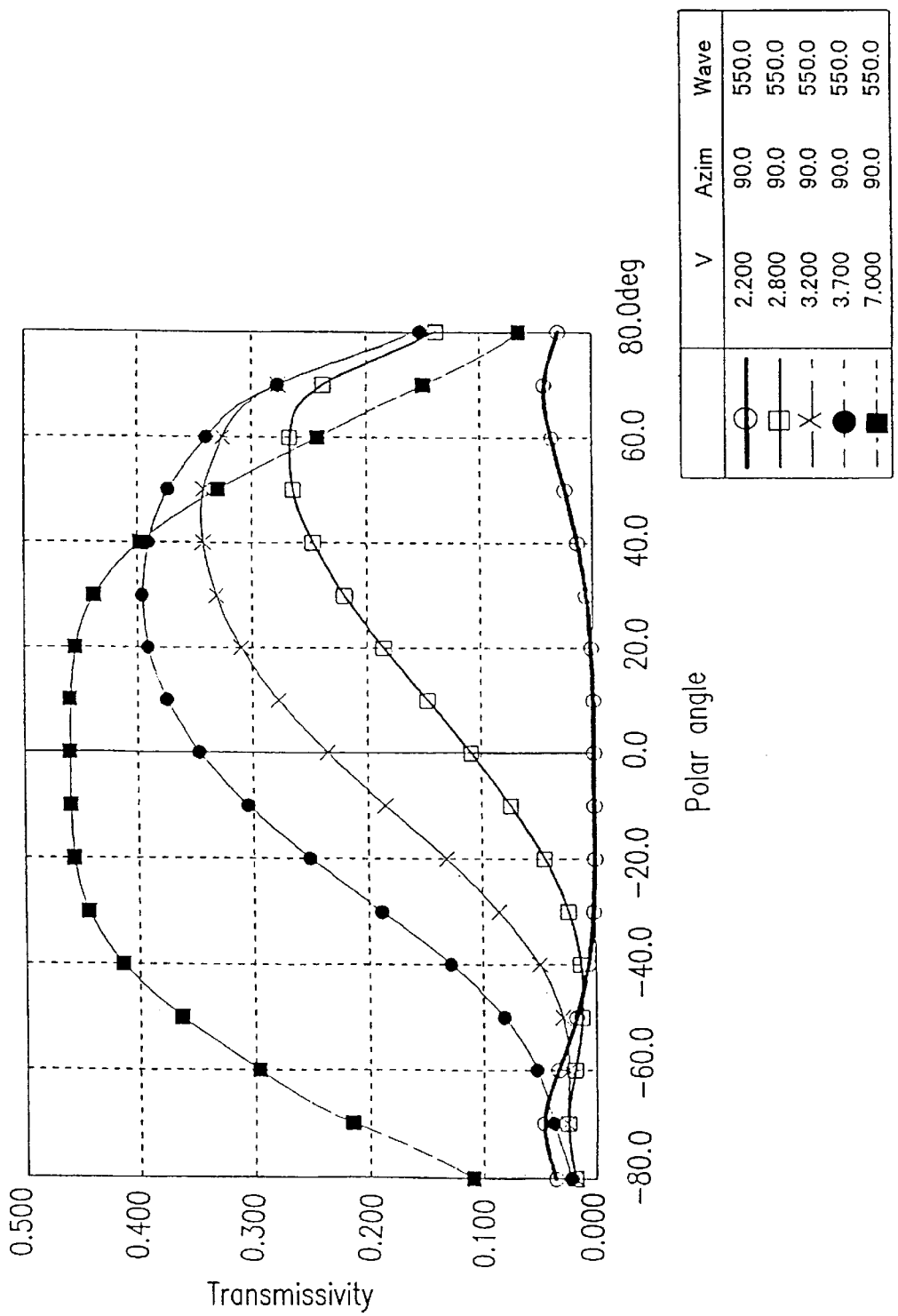
FIG. 5 is a graph showing gray scale characteristics in an up and down direction in 5 gray scales in the liquid crystal display device of Embodiment 1 of the present invention.

FIG. 3 shows a viewing angle region of the liquid crystal display device having a contrast of about 10 or more, FIG. 4 shows the gray scale characteristics of the liquid crystal display device in a right and left direction in 5 gray scales, and FIG. 5 shows the gray scale characteristics of the liquid crystal display device in an up and down direction in 5 gray scales. In the graph legend of FIG. 4, V represents a liquid crystal display voltage, Axim represents an azimuth, and Wave represents a light wavelength, all of which will be used in a similar manner hereinafter.

Hereinafter, a summary of the function of the present invention will be described.

Figure 1C:
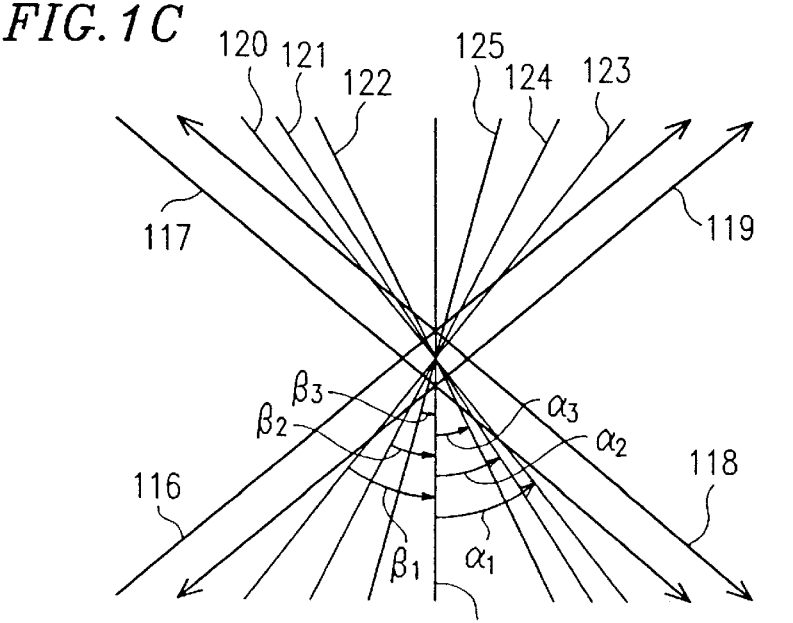

FIGS. 1A to 1C show a structure and corresponding optical characteristics of a representative liquid crystal display device according to the present invention. FIG. 1A is a perspective view showing directions of the principal refractive indices of a phase difference compensation element used in the present invention. Assuming that the phase difference compensation element is defined within an orthogonal coordinate system with the surface of the element being an x-y plane, three principal refractive indices of an index ellipsoid of the phase difference compensation element are na, nb, and nc, and the smallest principal refractive index among them is nc, the direction of the refractive index na is substantially parallel to the surface of the phase difference compensation element, and the directions of the refractive indices nb and nc are counterclockwise inclined in a direction represented by an arrow 20 about the direction (x-axis) of the principal refractive index na. More specifically, the direction of the smallest principal refractive index nc (direction of an optic axis) is inclined by a polar angle θ from a normal z to the surface of the phase difference compensation element.

FIG. 1B shows a cross-sectional structure of the liquid crystal display device, and FIG. 1C is an orthogonal projection view on a plane parallel to a substrate surface, showing a liquid crystal cell rubbing direction, an optical axis direction of a director of a liquid crystal molecule in an intermediate layer of the liquid crystal cell, a polarization axis direction of a polarizing plate, and an optic axis direction of a phase difference compensation element. The cross-sectional structure of the liquid crystal display device shown in FIG. 1B will be described later.

The present invention is characterized by the polar angle θ of the optic axis 102 (the principal refractive index nc) from the normal z not being prescribed to be 0°, but prescribed in a range of 0°<θ≦90°. In the prior art, the polar axis θ is substantially 0°.

Figure 2:
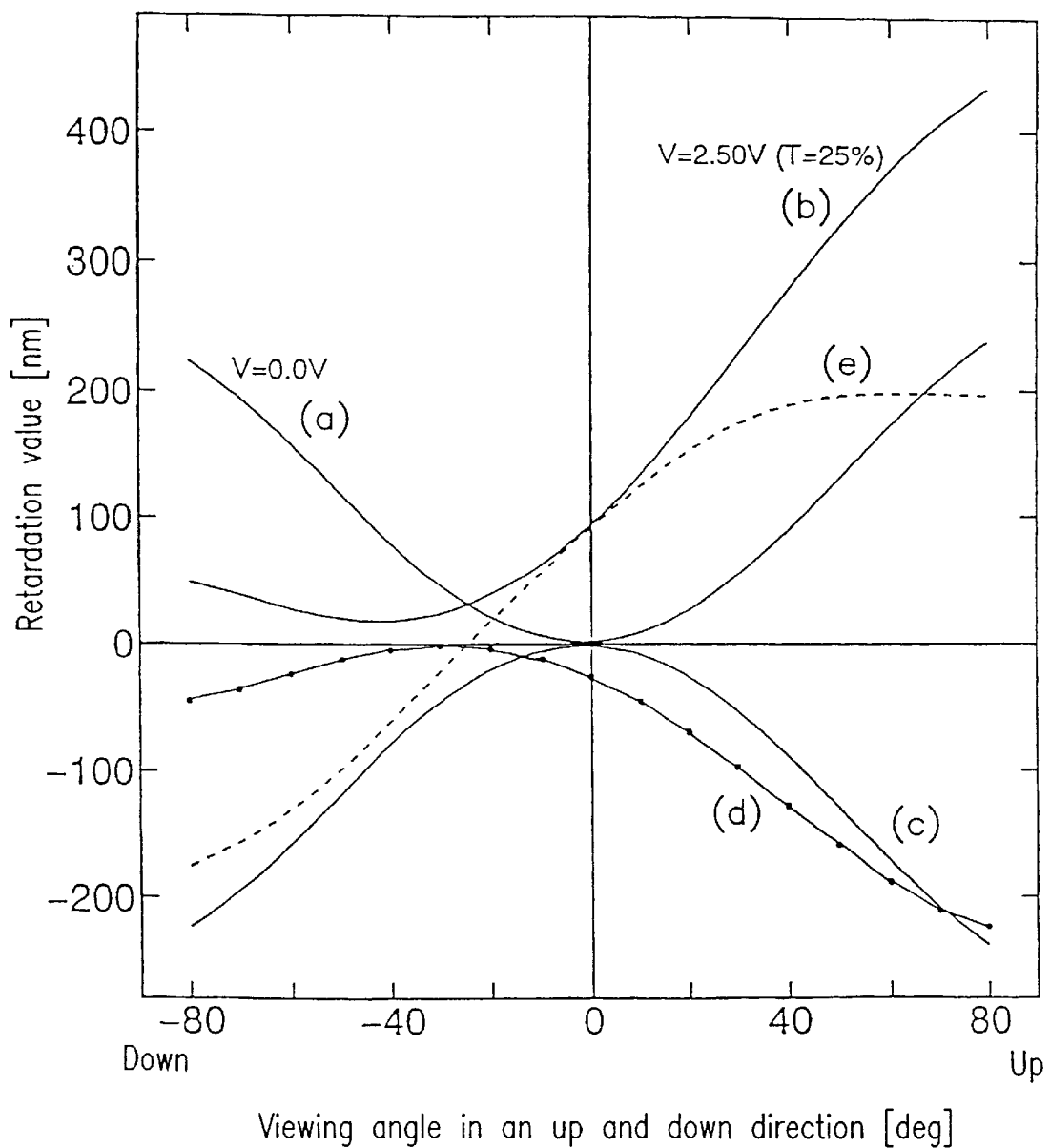
FIG. 2 is a graph showing the relationship between the viewing angle of an up and down direction of a display surface and the retardation value in a representative conventional liquid crystal display device using a homeotropic alignment film and an N-type nematic liquid crystal, together with the retardation value changes (d) of a phase difference compensation element of the present invention. The abscissa represents the viewing angle in an orthogonal projection direction of an optical axis of a director in an intermediate layer of a liquid crystal cell on the surface of a substrate, and the ordinate represents the retardation value.

FIG. 2 shows the viewing angle dependence in a direction (up and down direction of a display surface) in which the optical axes of the directors in an intermediate position of a liquid crystal cell in the liquid crystal display device using a homeotropic alignment film and an N-type nematic liquid crystal are orthogonally projected onto the surface of the substrate. In FIG. 2, (a) represents changes in the retardation value in the liquid crystal cell when no voltage is being applied, (b) represents changes in the retardation value in the liquid crystal cell at a transmissivity of about 25%, (c) represents changes in the retardation value in a conventional phase difference compensation film, (d) represents changes in the retardation value of the phase difference compensation element of the present invention, and (e) represents the sum of the retardation value (b) and the retardation value (c). FIG. 2 shows the case where the optical axes of the direction in an intermediate position of the liquid crystal cell are orthogonally projected onto the surface of the substrate. However, depending upon the pretilt angle of the liquid crystal molecules induced by the two alignment films interposing a liquid crystal layer, an optical axis of a director at a position closer to one of the substrates than to an intermediate position of the liquid crystal cell may be made a standard.

As is understood from FIG. 2, the changes in the retardation value (c) of the conventional phase difference compensation film and the changes in the retardation value (a) of the liquid crystal cell while no voltage is being applied take a local maximum value and a local minimum value, respectively at a viewing angle of 0°, and these changes cancel each other. The changes in the retardation value (b) of the liquid crystal cell at a transmissivity of about 25% take a local minimum value in the vicinity of a viewing angle of −40° in a downward direction. Furthermore the changes in the retardation value (e) (i.e., the sum of the retardation value (b) and the retardation value (c)) decrease with the increase in viewing angle in a downward direction, and becomes O in the vicinity of a viewing angle of −20°. If the viewing angle is further increased, the changes in the retardation value (e) takes a negative value with its absolute value increasing.

Thus, the transmissivity of the liquid crystal display device using a conventional phase difference compensation film decreases with the increase in viewing angle in a downward direction, and become a black state at a viewing angle of about −20°. If the viewing angle is further increased, the transmissivity increases to cause a gray scale inversion phenomenon.

According to the present invention, the phase difference compensation element is used, which cancels the retardation changes of the liquid crystal cell in the gray scale display state.

The viewing angle dependence characteristics of the retardation of the phase difference compensation element used in the present invention satisfy the above-mentioned conditions as schematically represented by (d) in FIG. 2. Therefore, according to the present invention, in the liquid crystal display device using a liquid crystal cell provided with a homeotropic alignment film and an N-type nematic liquid display, a viewing angle region in which a gray scale inversion phenomenon does not occur can be increased.

Furthermore, according to the present invention, a phase difference compensation element in which the polar angle θ shown in FIG. 1A is not 0° and α and β shown in FIG. 1C are different can be used. Alternatively, a phase difference compensation element in which the polar angle θ shown in FIG. 1A is not 0° and α and β shown in FIG. 1C are continuously changed in the phase difference compensation element can be used. As the former phase difference compensation element, one phase difference compensation film or a layered plurality of phase difference compensation films may be used. In the case of using the layered type phase difference compensation element, the entire θ should not be 0°. Furthermore, it is desirable that α and β are made different.

Optimum optical compensation for both a gray scale display and a black display can be performed by using the above-mentioned phase difference compensation element.

According to the present invention, at least one phase difference compensation element is provided between at least one of the polarizing plates interposing a liquid crystal cell and the liquid crystal cell. Assuming that the principal refractive indices of an index ellipsoid are na, nb, and nc, then relationships na>nb and na>nc are satisfied, and an angle formed by an na axis and a normal to a surface of the phase difference compensation element is in a range of about 0° to about 90°. In a case where the optic axes are orthogonally projected onto the substrate of the liquid crystal cell, assuming that an axis bisecting a narrow angle formed by the polarization axes of the two polarizing plates on both sides of the liquid crystal cell matches with a director axis of a liquid crystal molecule in a liquid crystal cell and an axis orthogonal to the director axis is an axis A, an axis obtained by orthogonally projecting the na axis onto the substrate of the liquid crystal cell is in a clockwise direction or a counterclockwise direction of the axis A, and an angle formed by an axis obtained by orthogonally projecting the na axis onto the substrate of the liquid crystal cell and the axis A is in a range of about 0° to about 45°. Thus, optimum optical compensation for both a gray scale display and a black display can be performed.

EMBODIMENT 2

A liquid crystal display device of Embodiment 2 has a structure in which the phase difference compensation films 104, 105, 113, and 114 are omitted from the liquid crystal display device shown in FIG. 18, thereby leaving only one phase difference compensation film 106 and 112 on each side of the device.

More specifically, the two phase difference compensation films 106 and 112 each have a polar angle θ which is prescribed to be about 15°, and the azimuths α1 and β1 in FIG. 1C are both prescribed to be about 35°.

Figure 6:
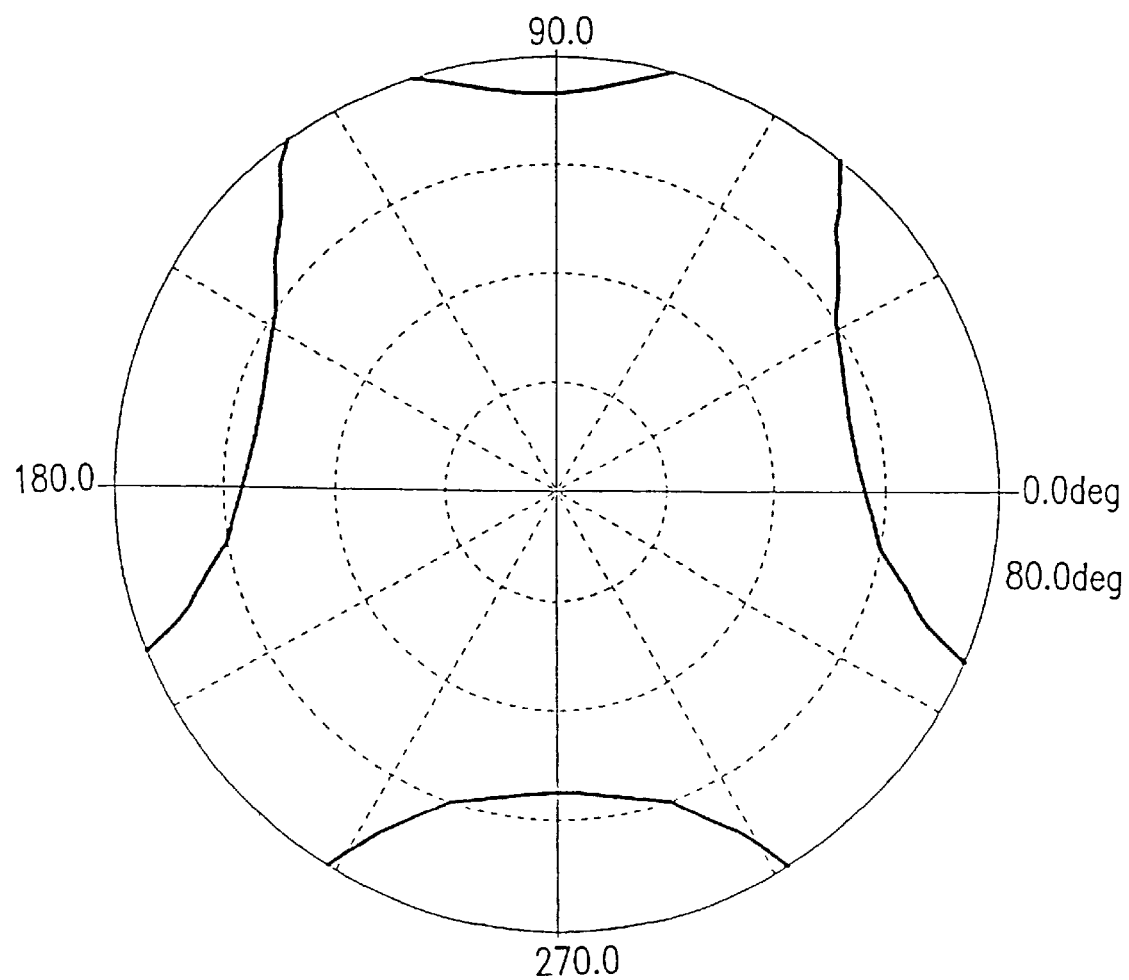
FIG. 6 is a view showing a viewing angle region having a contrast of 10 or more in a liquid crystal display device of Embodiment 2 of the present invention.
Figure 7:
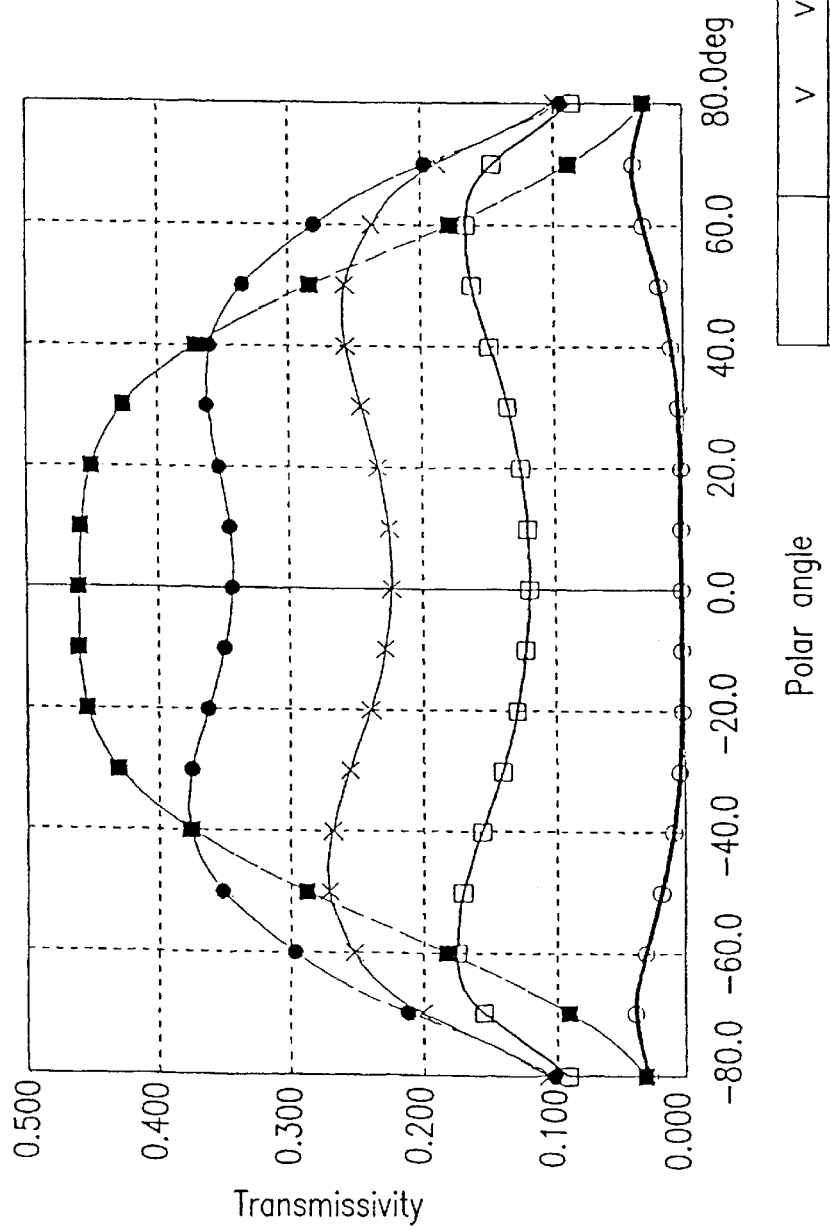
FIG. 7 is a graph showing gray scale characteristics in a right and left direction in 5 gray scales in the liquid crystal display device of Embodiment 2 of the present invention.
Figure 8:
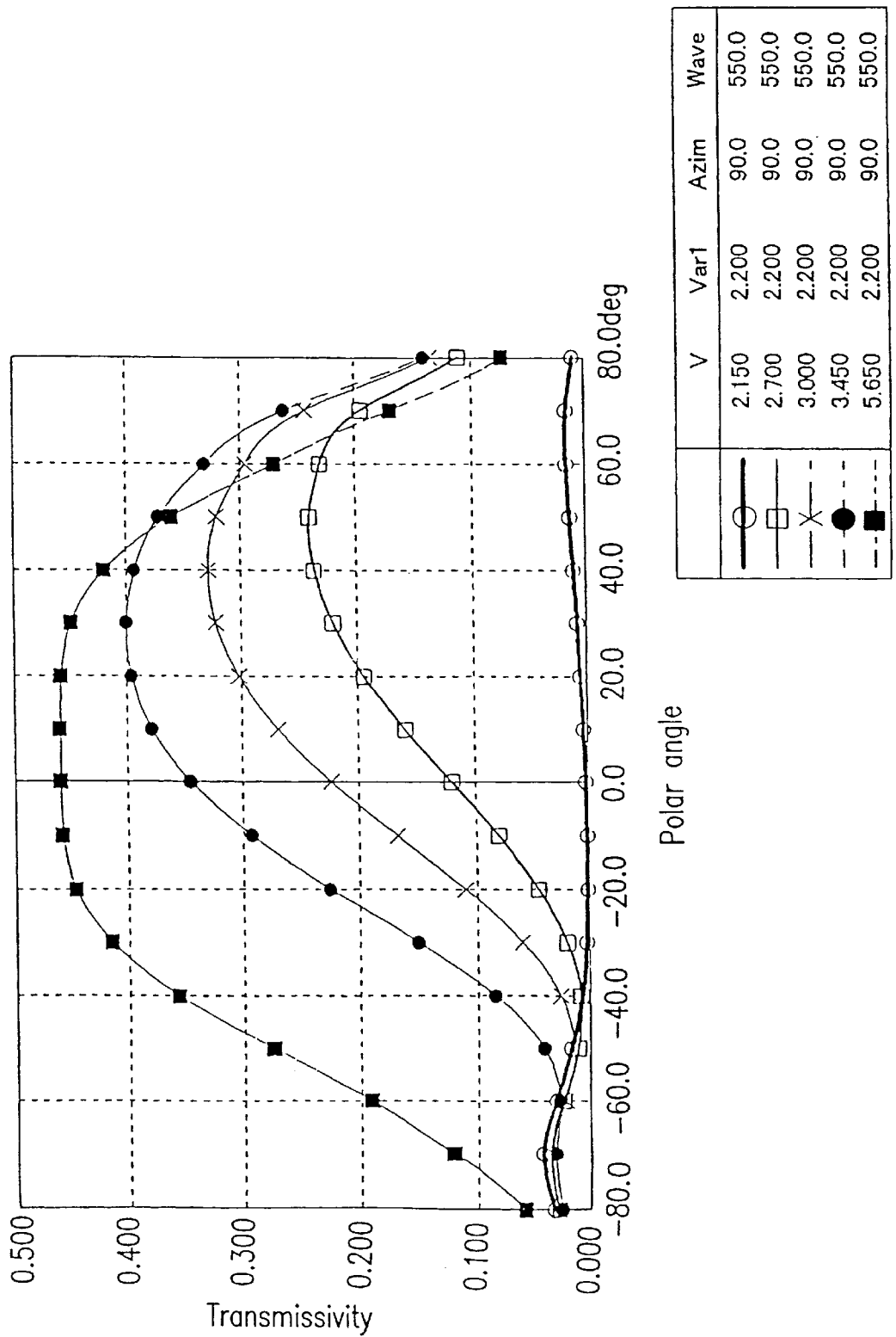
FIG. 8 is a graph showing gray scale characteristics in an up and down direction in 5 gray scales in the liquid crystal display device of Embodiment 2 of the present invention.

FIG. 6 shows a viewing angle region of the liquid crystal display device having a contrast of about 10 or more. FIG. 7 shows the gray scale characteristics of the liquid crystal display device in a right and left direction in 5 gray scales, and FIG. 8 shows the gray scale characteristics of the liquid crystal display device in an up and down direction in 5 gray scales.

COMPARATIVE EXAMPLE

In Comparative Example, one phase difference compensation film 106 whose θ shown in FIG. 1A is prescribed to be about 0° is provided on the same liquid crystal cell as that of Embodiment 1. More specifically, in Comparative Example, the phase difference compensation films 104, 105, 112, 113, and 114 are omitted, and the optic axes 120 to 125 shown in FIG. 10 disappear.

Figure 9:
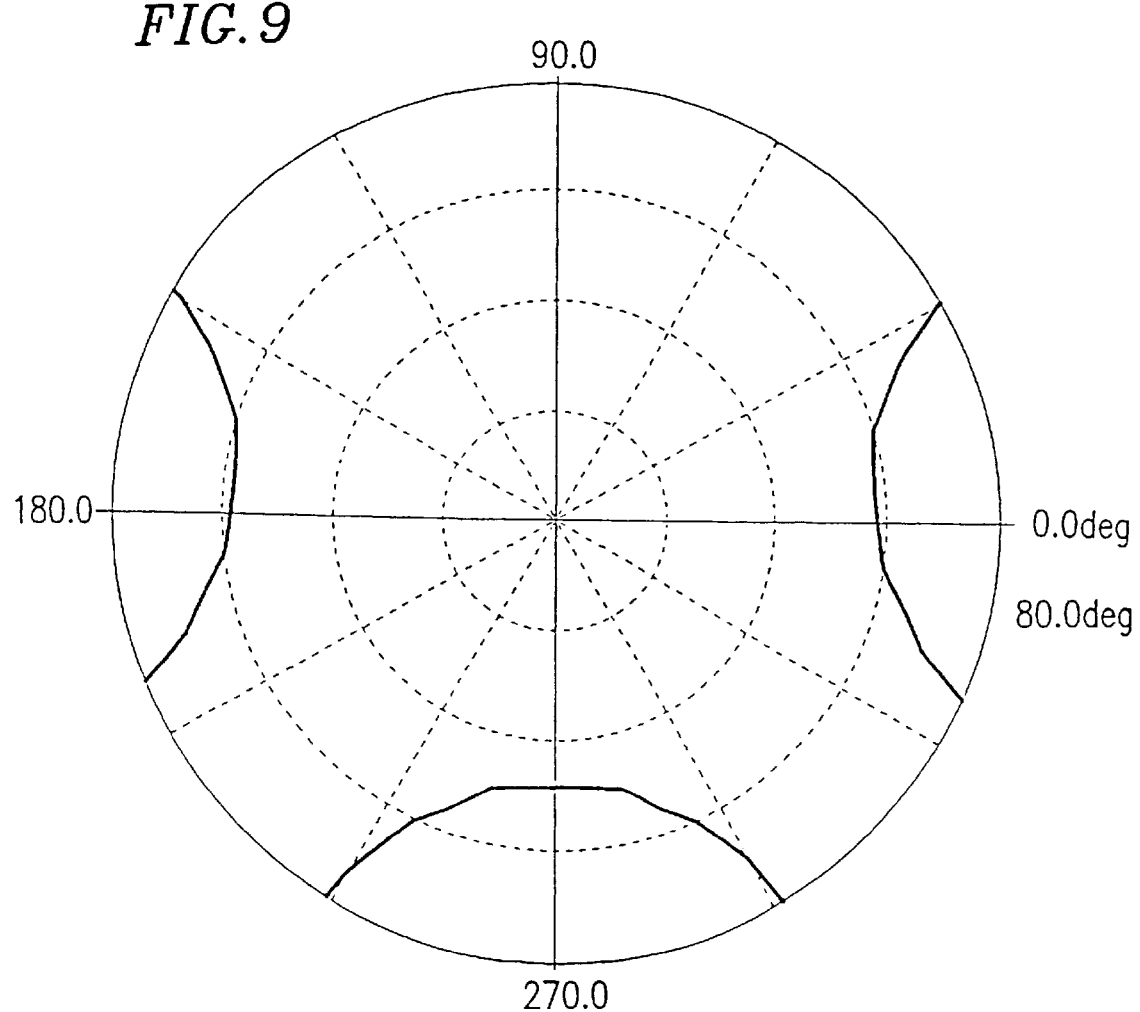
FIG. 9 is a view showing a viewing angle region having a contrast of 10 or more in a liquid crystal display device of Comparative Example.
Figure 10:
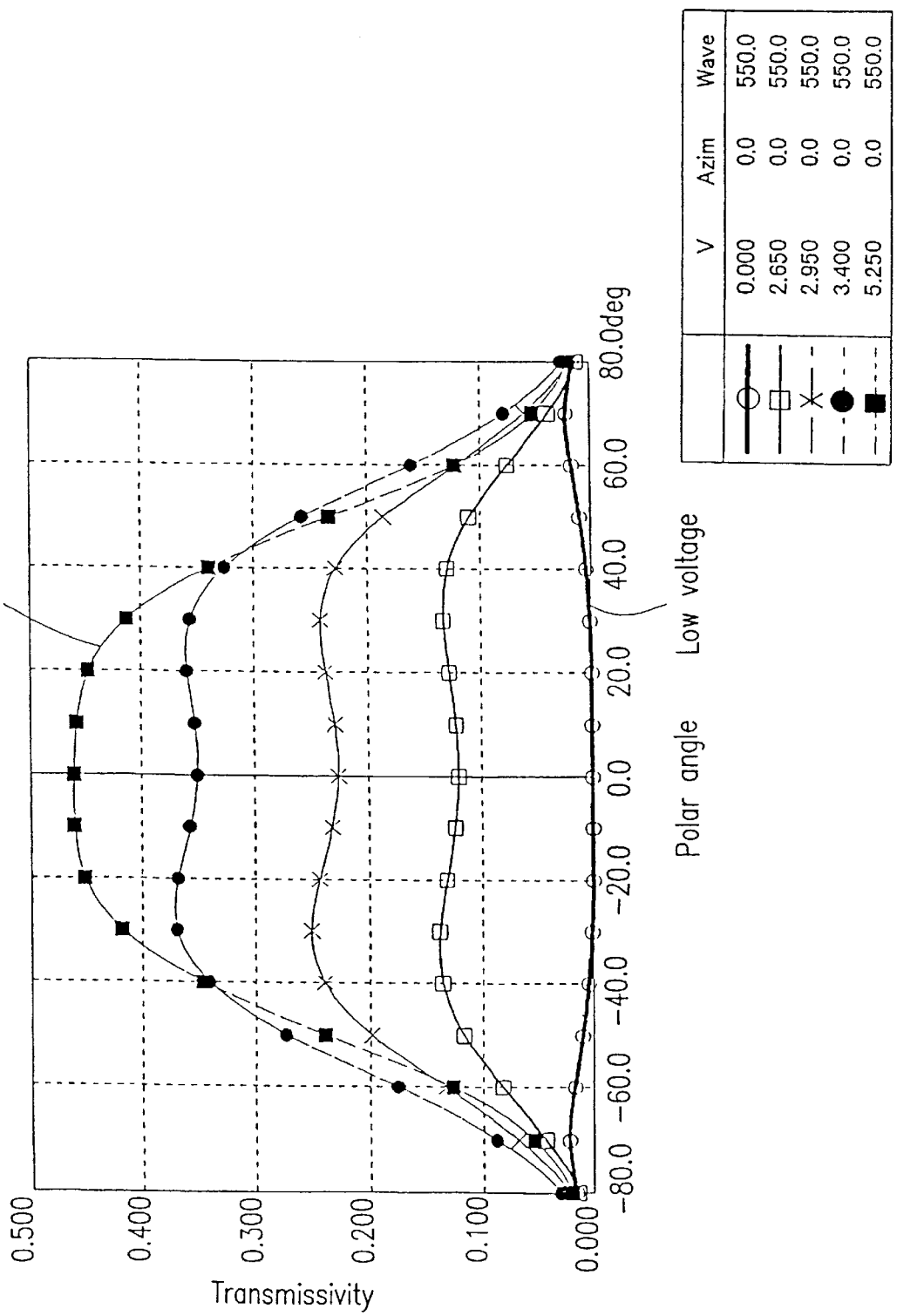
FIG. 10 is a graph showing gray scale characteristics in a right and left direction in 5 gray scales in the liquid crystal display device of Comparative Example.
Figure 11:
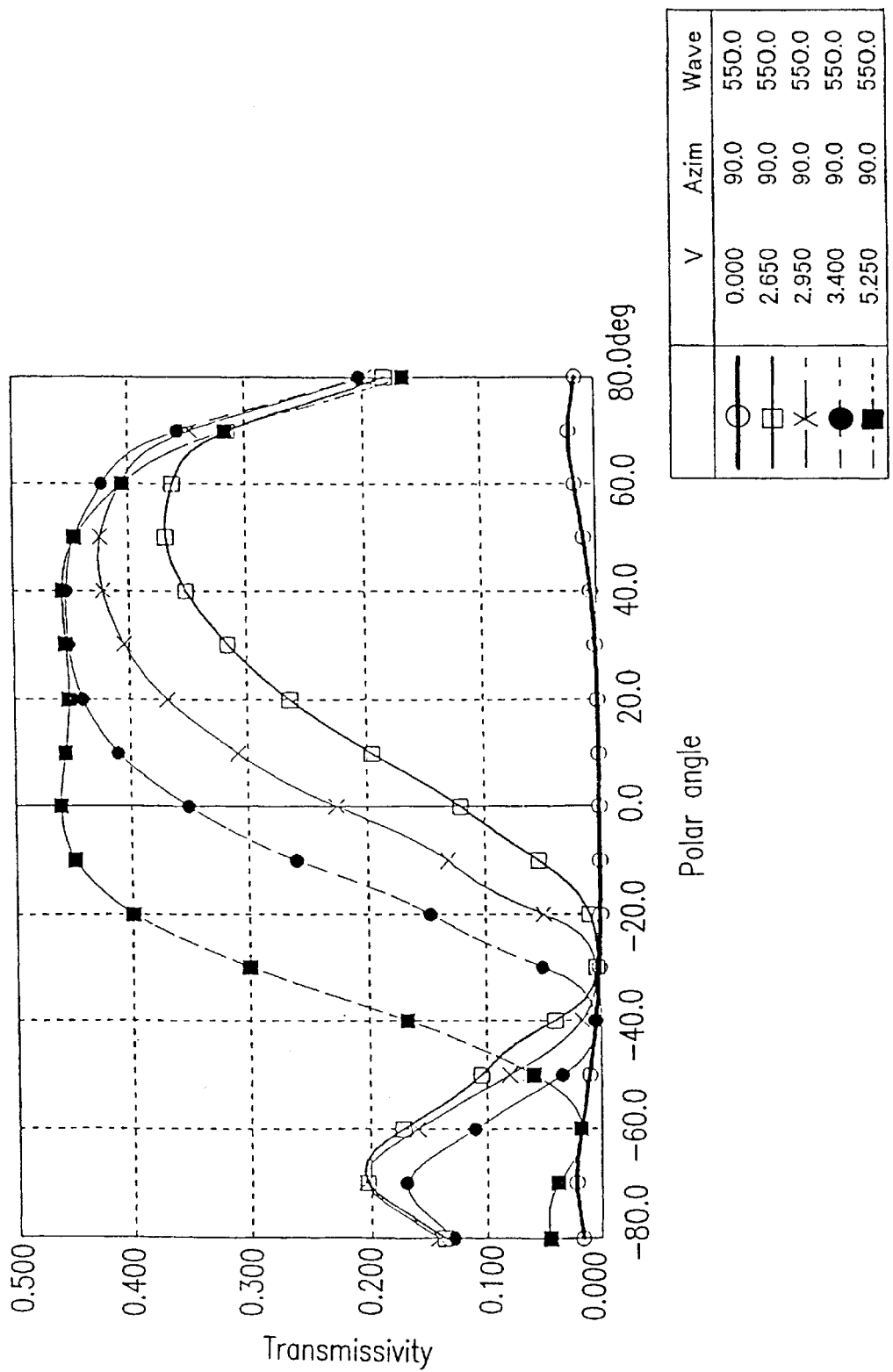
FIG. 11 is a graph showing gray scale characteristics in an up and down direction in 5 gray scales in the liquid crystal display device of Comparative Example.

FIG. 9 shows a viewing angle region of the liquid crystal display device having a contrast of about 10 or more, FIG. 10 shows the gray scale characteristics of the liquid crystal display device in a right and left direction in 5 gray scales, and FIG. 11 shows the gray scale characteristics of the liquid crystal display device in an up and down direction in 5 gray scales.

As is understood from FIGS. 3 to 11, in Comparative Example, a gray scale transmissivity of about 25% (V=2.650) and a gray scale transmissivity of about 50% (V=2.950) are inverted at a viewing angle of about 30° or more in a downward direction (FIG. 11). In Embodiment 2, a gray scale transmissivity of about 25% (V=2,700) and a gray scale transmissivity of about 50% (V=3,000) are inverted at a viewing angle of about 55° or more in a downward direction (FIG. 8), and in Embodiment 1, a gray scale transmissivity of about 25% (V=2,800) and a gray scale transmissivity of about 50% (V=3,200) are inverted at a viewing angle of about 60° or more in a downward direction (FIG. 5). Accordingly, it is apparent that a gray scale inversion phenomenon is suppressed according to the present invention.

Embodiments 1 and 2 have a structure in which one or three phase difference compensation films are provided between the liquid crystal cell and each polarizing plate. However, the present invention is not limited thereto. There is no limit to the number of phase difference compensation films which may be included in the phase difference compensation element. Furthermore, the optic axis polar angle and the azimuth are not limited to those described in the above-mentioned embodiments.

In the above-mentioned Embodiments 1 and 2, an alternative phase difference compensation element, as described below, can be used in a similar manner. More specifically, a phase difference compensation element can be used, having a structure in which, assuming that the principal refractive indices of an index allipsoid are na, nb, and nc, the relationship na=nb<nc is satisfied, at least one of the direction of the principal refractive index na and the direction of the principal refractive index nb is in a plane substantially parallel to the surface of a phase difference compensation element, and the direction of the principal refractive index nc is inclined from a normal to the phase different compensation element.

Alternatively, a phase difference compensation element can be used, having a structure in which, assuming that the principal refractive indices of an index ellipsoid are na, nb, and nc, the relationships na>nc and nb>nc are satisfied, and the direction of the principal refractive index nc is inclined from a normal to the phase difference compensation element. In this case, a polar angle θ between the normal to the phase difference compensation element and the direction of the principal refractive index no should be prescribed to satisfy the relationship 0°<θ≦90°. According to this alternative embodiment of the present invention, the phase difference compensation element as described above may be provided only on one side of the liquid crystal cell. This alternative embodiment can also be similarly applied to the following Embodiments 3–6.

EMBODIMENT 3

In Embodiment 3, a liquid crystal display device has phase difference compensation elements having a phase difference compensation films 304 and 314 instead of the phase difference compensation films 104 and 114, in which a polar angle (i.e., θ in FIG. 1A) of an optic axis continuously changes in the range of about 0° to about 90° in a thickness direction are provided, with azimuths α1 and β1 in FIG. 1B being about 35°. Thus, the liquid crystal display device of the present embodiment is produced.

In Embodiment 3, the phase difference compensation films 105, 106, 112, and 113 shown in FIG. 1B are eliminated.

Figure 12:
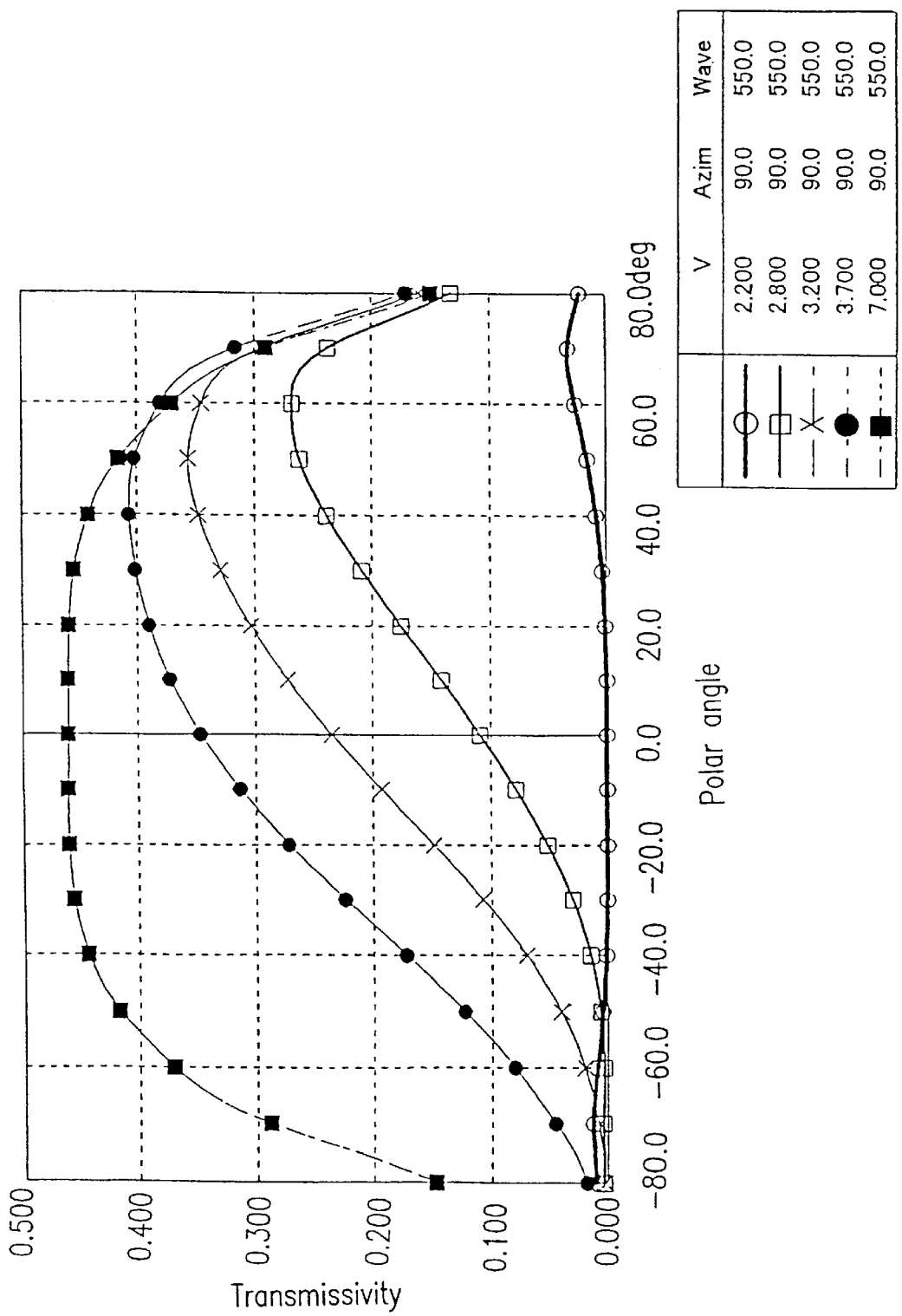
FIG. 12 is a graph showing gray scale characteristics in an up and down direction in 5 gray scales in a liquid crystal display device of Embodiment 3 according to the present invention.

FIG. 12 shows viewing angle characteristics of a gray scale display in an up and down direction of the liquid crystal display device of the present embodiment. As is understood from FIG. 12, a transmissivity of about 25% (V=2,000) and a transmissivity of about 50% (V=3,200) are inverted at a viewing angle of about 80°. Thus, more satisfactory characteristics than those in Embodiments 1 and 2 are obtained.

In the present embodiment, the viewing angle range in which a gray scale inversion does not occur is widened, compared with Embodiment 2 for the following reason. The values θ formed by the phase difference compensation films 304 and 314 are continuously changed, whereby a viewing angle at which the retardation value of the phase difference compensation element becomes 0 does not exist. In the case where the value θ does not change in the phase difference compensation film, the retardation value of the phase difference compensation element changes with respect to the changes in viewing angle in an up and down direction as represented by a curve (d) as shown in FIG. 2. More specifically, at a predetermined viewing angle (about 30° in a down direction in FIG. 2), the retardation value becomes 0. As represented by a curve (b) shown in FIG. 2, the retardation value of the liquid crystal cell does not become 10 in the entire viewing angle range. If the difference in viewing angle characteristics of the retardation values in the curves (b) and (d) is eliminated, the gray scale inversion phenomenon of interest can be improved.

In Embodiment 3, the reason why the viewing angle at which the retardation value of the liquid crystal cell becomes 0 does not exist is that the polar angle of the director axis of a liquid crystal molecule continuously changes in a cell thickness direction in the liquid crystal cell.

Figure 13A:
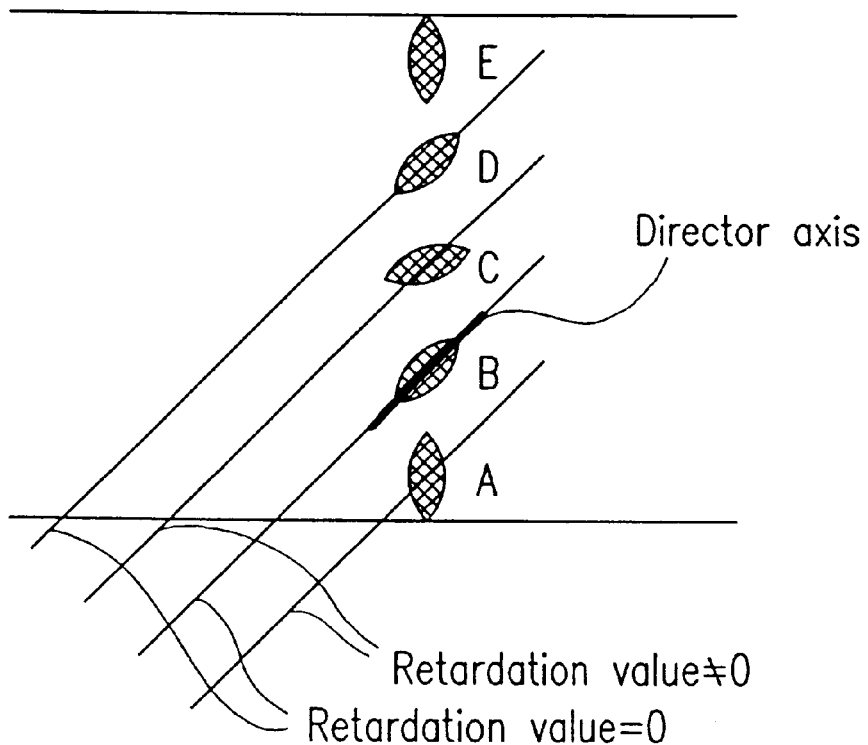
FIGS. 13A and 13B schematically show a state of the liquid crystal molecules in a liquid crystal display cell during a gray scale display of the liquid crystal display device of Embodiment 3 according to the present invention.

FIG. 13A schematically shows a state of liquid crystal molecules in a liquid crystal cell during a gray scale display. The retardation value with respect to light traveling in parallel to a major axis (the director axis) of each liquid crystal molecule is 0. For example, at viewing angles parallel to the major axis directions of the liquid crystal molecules B and D in FIG. 13A, the retardation value represented by these liquid crystal molecules are 0. However, the liquid crystal molecules A, C, and E exhibit finite retardation. Thus, a finite retardation is obtained for a liquid crystal layer as a whole.

Figure 13B:
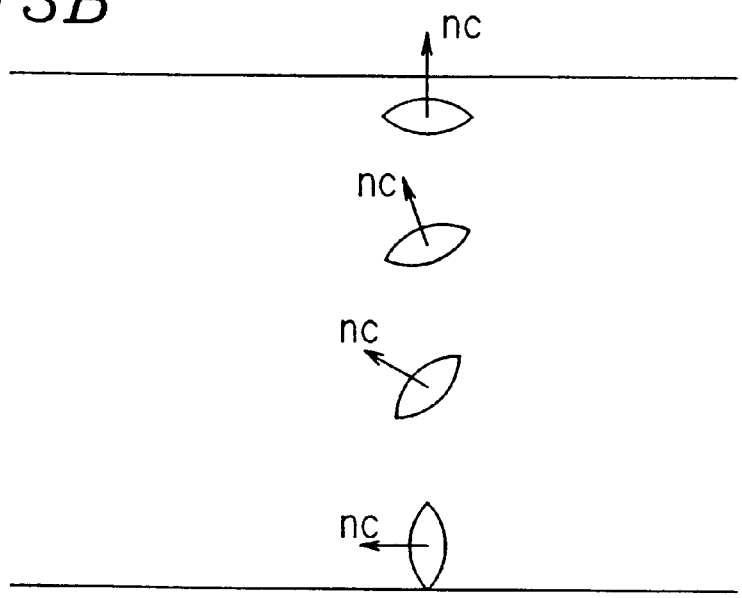
Figure 14A:
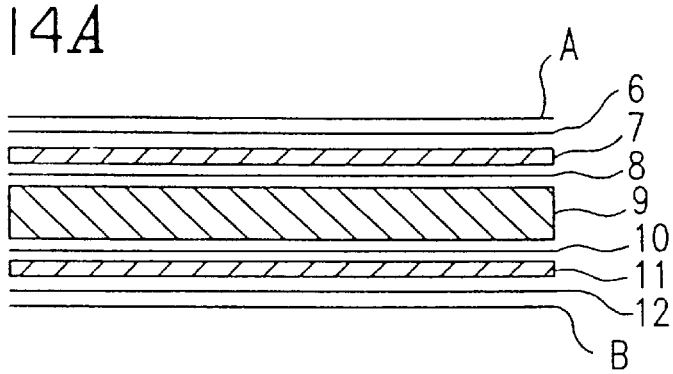
FIGS. 14A and 14B illustrate a structure of a conventional liquid crystal display device.
Figure 14B:
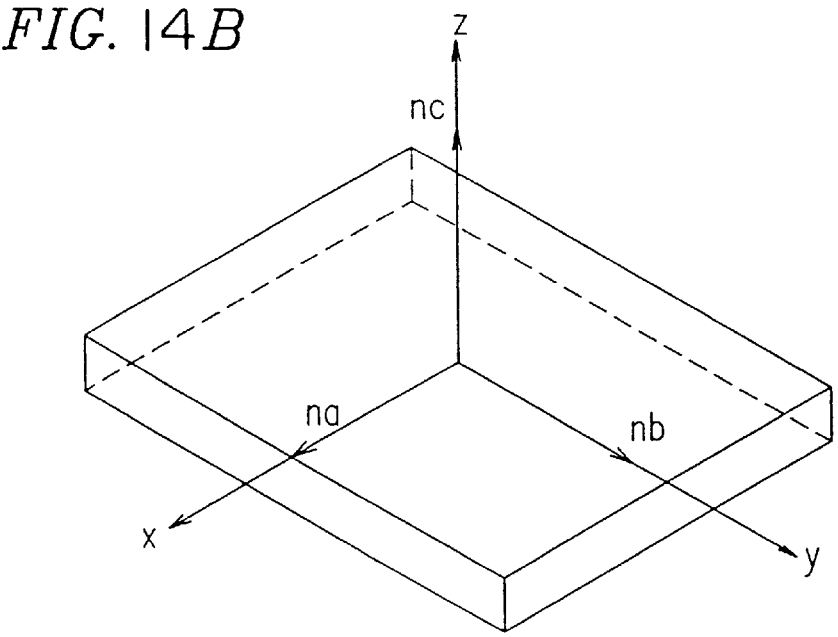

In the phase difference compensation element used in Embodiment 3, as schematically shown in FIG. 13B, the optic axis (the no axis in FIG. 1A) continuously changes in a thickness direction of a film. According to the same principle as described above, a viewing angle at which the retardation value of the entire film becomes 0 does not exist, and a satisfactory improvement of a gray scale invention phenomenon can be achieved.

As the phase difference compensation element, one phase difference compensation film in which the azimuth of the optic axis is continuously changed is used. Alternatively, one phase difference compensation film in which the polar angle and the azimuth are continuously changed and in which an aggregate optic axis of the phase difference compensation film is inclined from a normal to the phase difference compensation element may be used. Furthermore, according to the present invention, two or more phase difference compensation films can be used, with the azimuths α and β being made different as described in Embodiment 1.

Furthermore, it should be appreciated that in the above-mentioned Embodiments 1 to 3, the phase difference compensation element may be provided on only one side of the liquid crystal ell instead of being provided on both sides of the liquid crystal cell.

Furthermore, according to the present invention, the phase difference compensation element of either of the above-mentioned Embodiments 1 to 3 and the phase difference compensation element of Embodiment 4 may be combined.

EMBODIMENT 4

Figure 15A:
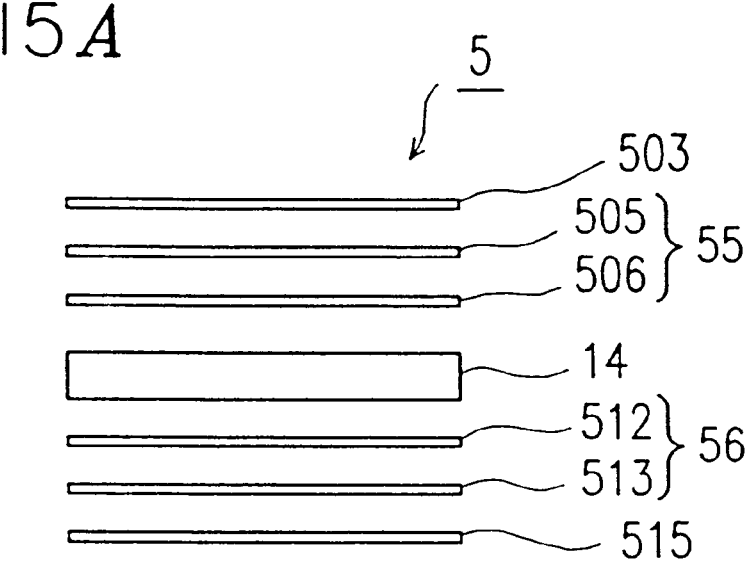
FIG. 15A is a cross-sectional view of a liquid crystal display device of Embodiment 4 according to the present invention, showing an exemplary layered structure of polarizers, phase difference compensation elements, and a liquid crystal cell.

A liquid crystal display device 5 shown in FIG. 15A includes a liquid crystal cell 14, and two phase difference compensation elements 55 and 56 interposing the liquid crystal cell 14 therebetween. Furthermore, the liquid crystal display device 5 has polarizing plates 503 and 515 positioned on the phase difference compensation elements 55 and 56, respectively.

The phase difference compensation element 55 has phase difference compensation films 506 and 505 in this order from the liquid crystal cell 14 side. In addition, the phase difference compensation element 56 has phase difference compensation films 512 and 513 in this order from the liquid crystal cell 14 side. The respective phase difference compensation films have birefringence.

Figure 15B:
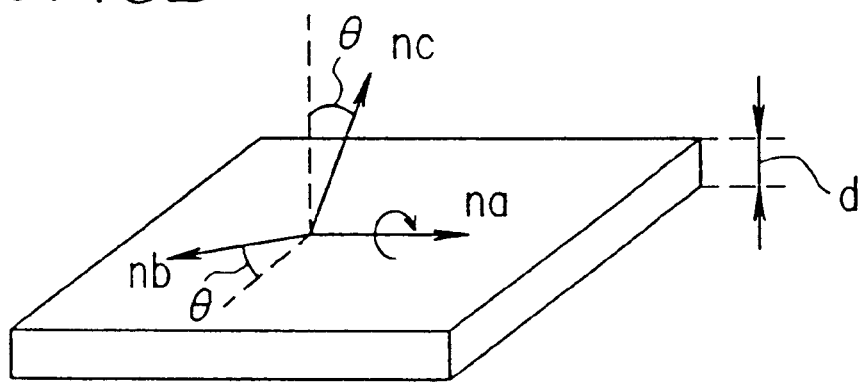
FIG. 15B is a view illustrating anisotropy of a refractive index of the phase difference compensation film of Embodiment 4 shown in FIG. 15A.

FIG. 15B shows the directions of the principal axes of an index ellipsoid (not shown) for the phase difference compensation films 505, 506, 512, and 513. It is assumed that the refractive indices (principal refractive indices) along the principal axes of the index ellipsoid are na, nb, and nc, respectively. Furthermore, it is assumed that in the case where the index ellipsoid is rotated about the principal axis having the refractive index na, an angle formed by the principal axis having the refractive index nc and the normal to the surface of the liquid crystal cell 14 is θ. In the figure, d denotes the thickness of the phase difference compensation film.

In the phase difference compensation films 506 and 512, nc<na, nc<nb, and θ=0°. In the phase difference compensation films 505 and 513, no<na, nc<nb, and θ>0°.

Figure 15C:
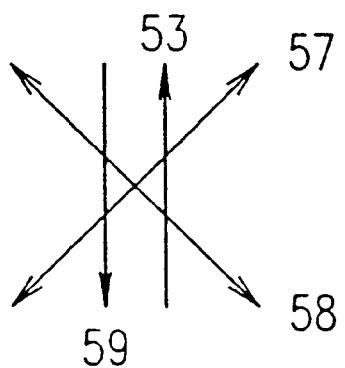
FIG. 15C is a view showing the relationship between the optic axes of the phase difference compensation elements and the absorption axes of the polarizers shown in FIG. 15A.

Furthermore, as shown in FIG. 15C, in the phase difference compensation films 505 and 513, the direction in which the principal axis having the refractive index nc is tilted from the normal is opposite from the direction in which a liquid crystal director is tilted from the normal. In FIG. 15C, an arrow 53 shows the direction in which the principal axis is tilted, and an arrow 59 denotes the direction in which the liquid crystal director is tilted. Furthermore, the direction of the arrow 59 is identical with the downward direction of a display surface. The arrows 57 and 58 show the directions of the absorption axes (polarization axes) of the polarizing plates 503 and 515, respectively.

With the above-mentioned structure, a phase difference compensation element can be easily produced.

Hereinafter, one example of the present embodiment will be shown.

The phase difference compensation films 506 and 512 are constructed so that $d \times (na-no)=14$ nm $d \times (nb-nc)=14$ nm, and $\theta=0°$ The phase difference compensation films 505 and 513 are constructed so that $d \times (ns-nc)=86$ nm $d \times (nb-nc)=86$ nm, and $\theta=20°$ The liquid crystal cell 14 may be the same as that described in Embodiment 1.

Figure 16:
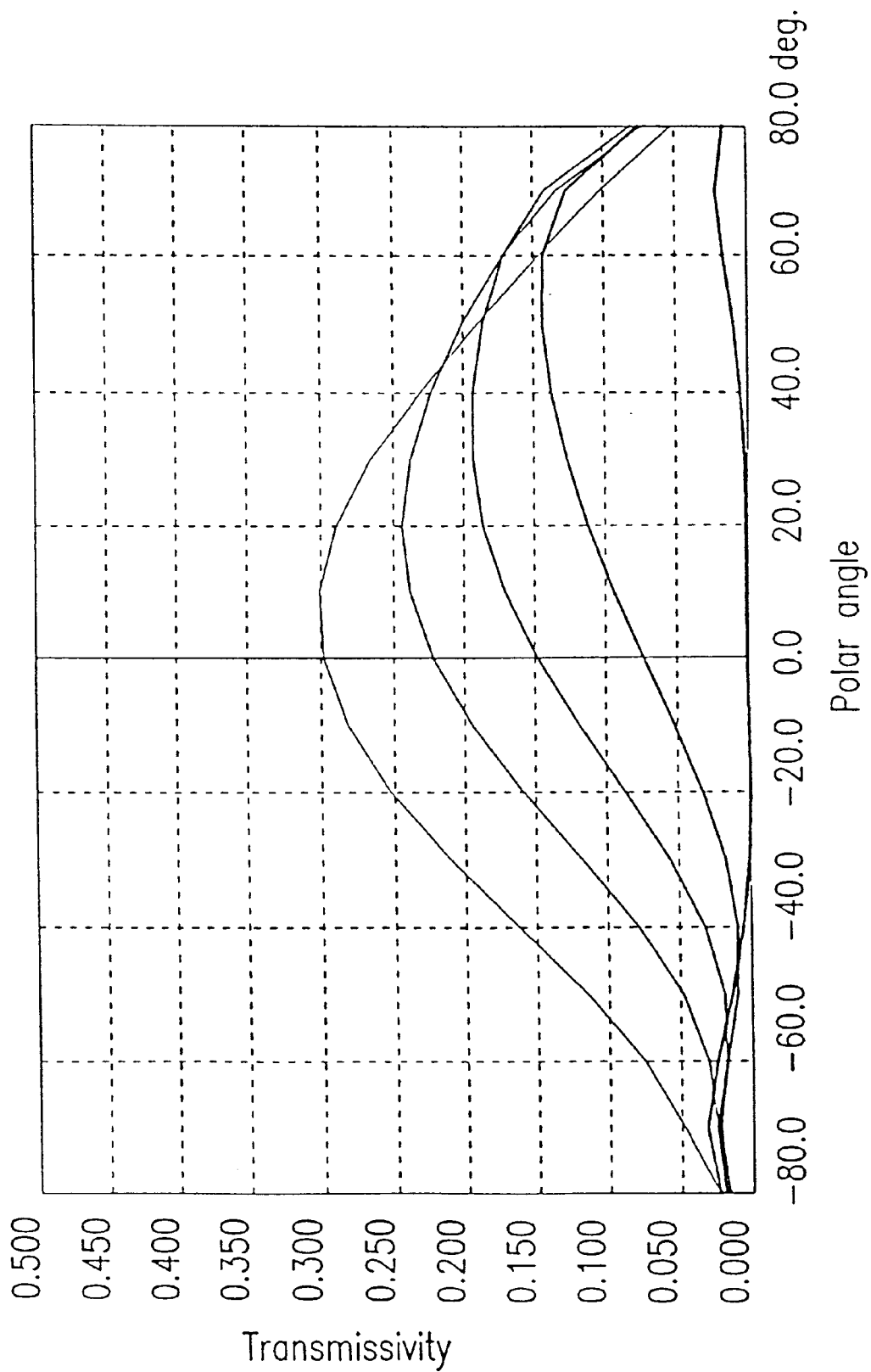
FIG. 16 is a graph showing the gray-scale characteristics of the liquid crystal display device of Embodiment 4 when observed in an up and down direction.
Figure 17:
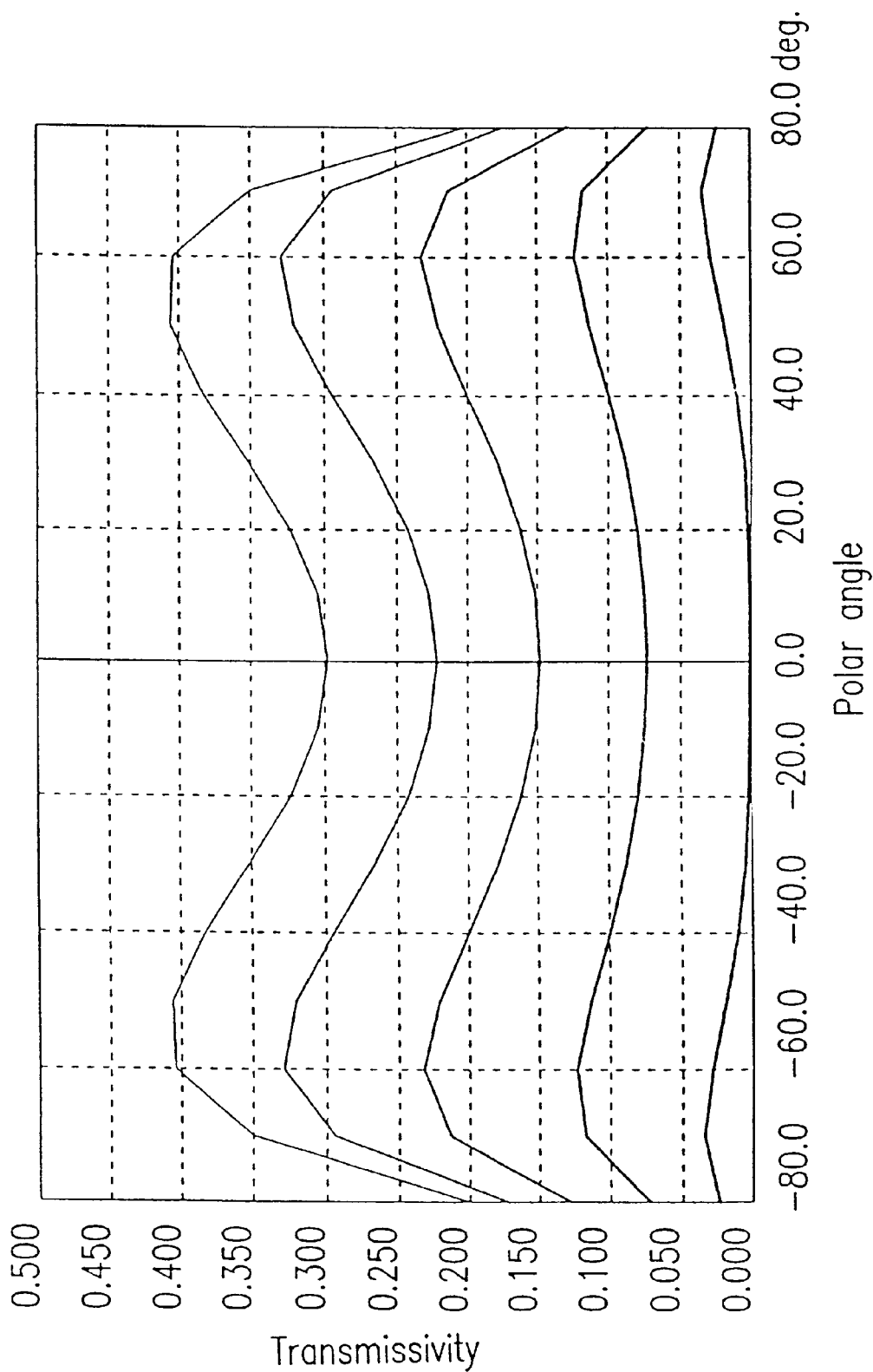
FIG. 17 is a graph showing the gray-scale characteristics of the liquid crystal display device of Embodiment 4 when observed in a right and left direction.

The graph in FIG. 16 shows the gray-scale characteristics of the liquid crystal display device 5 described above in an up and down direction. The graph in FIG. 17 shows the gray-scale characteristics in a right and left direction. It is confirmed that with the liquid crystal display device 5 of the present embodiment, a gray-scale inversion phenomenon is eliminated in a downward direction in the same way as in Embodiment 1.

EMBODIMENT 5

In Embodiment 5, in the aggregate, there is no anisotropy of a refractive index in the phase difference compensation elements in a plane parallel to the surface of a liquid crystal cell. In contrast, in the above-mentioned embodiments 1 through 3 and 5, since one of three principal axes of an index ellipsoid is tilted from the normal to the surface of the liquid crystal call, anisotropy is caused in a refractive index in a plane parallel to the surface of the liquid crystal cell. More specifically, in the above-mentioned embodiments, the value of a refractive index in a direction in which the principal axis is tilted is small. With this structure, a liquid crystal display device transmits light even while no voltage is being applied to a liquid crystal layer. Therefore, in the case where a voltage cancelling the above-mentioned anisotropy of a refractive index of a phase difference compensation element is applied to the liquid crystal cell 14, the transmissivity of the device becomes zero and a black display is achieved. A liquid crystal display device having such a voltage-transmissivity characteristic requires a precise voltage control mechanism in a driving circuit, which is not preferable in terms of practical use. In the present embodiment, such inconvenience is eliminated as will be discussed below.

Figure 18A:
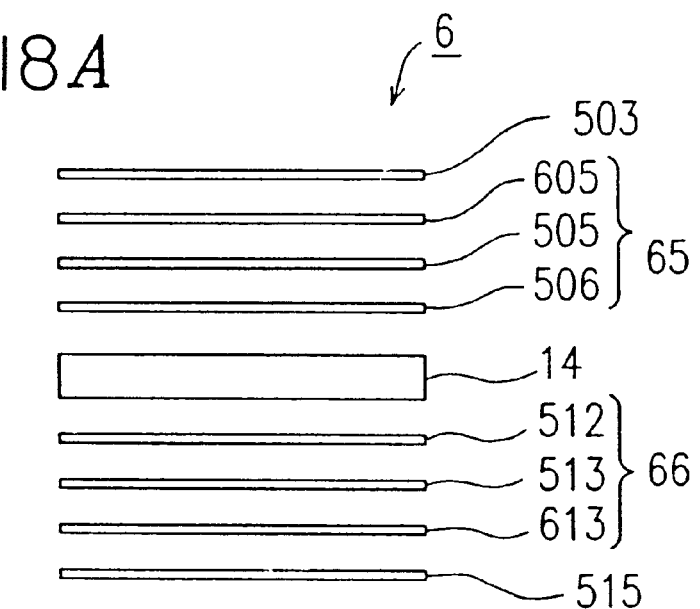
FIG. 18A is a cross-sectional view of a liquid crystal display device of Embodiment 6 according to the present invention, showing an exemplary layered structure of polarizers, phase difference compensation elements, and a liquid crystal cell.

A liquid crystal display device 6 shown in FIG. 18A includes a liquid crystal cell 14, and two phase difference compensation elements 65 and 66 interposing the liquid crystal call 14 therebetween. Furthermore, the liquid crystal display device 6 has polarizing plates 503 and 515 positioned on the phase difference compensation elements 65 and 66, respectively.

The phase difference compensation element 65 has a phase difference compensation film 605 between the phase difference compensation film 505 and the polarizing plate 503. In this respect, the phase difference compensation element 65 is different from the phase difference compensation element 55 of Embodiment 4. The phase difference compensation element 66 has a phase difference compensation film 613 between the phase difference compensation film 513 and the polarizing plate 515. In this respect, the phase difference compensation element 66 is different from the phase different compensation element 56 of Embodiment 4. The respective phase difference compensation films of the present embodiment have birefringence.

Figure 18B:
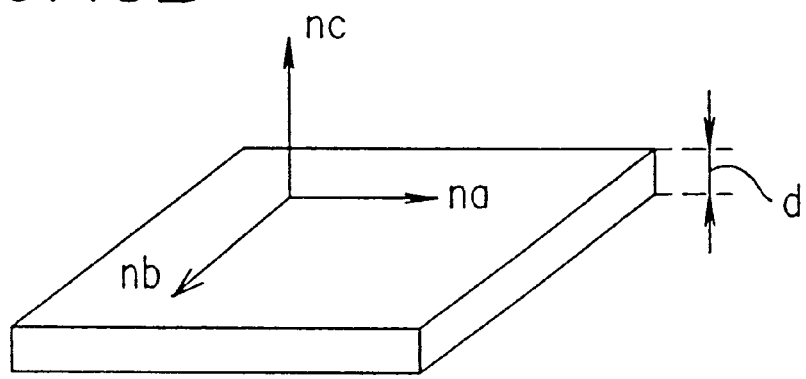
FIG. 18B is a view illustrating anisotropy of a refractive index of the phase difference compensation film of Embodiment 5 shown in FIG. 18A.
Figure 18C:
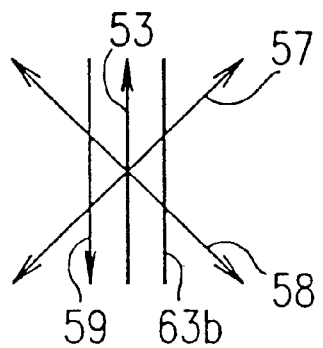
FIG. 18C is a view showing the relationship between the optic axes of the phase difference compensation elements and the absorption axes of the polarizers shown in FIG. 10A.

FIG. 18B shows the directions of the principal axes of an index ellipsoid (not shown) on the phase difference compensation films 605 and 613. It is assumed that the refractive indices (principal refractive indices) along the principal axes of the index ellipsoid are na, nb, and nc, respectively. The principal axis having the refractive index no is parallel to the normal to the surface of the liquid crystal cell 14. Furthermore, the phase difference compensation films 605 and 613 are constructed so that $d \times (nb-na)=10$ nm, and $d \times (nb-nc)=10$ nm As shown in FIG. 18C, the direction of the principal axis having the refractive index nb is parallel to the line 63b.

The directions of the principal axes of the index ellipsoid and retardation values in the phase difference compensation films 505, 506, 512, and 513 are the same as those described in Embodiment 4.

Figure 19:
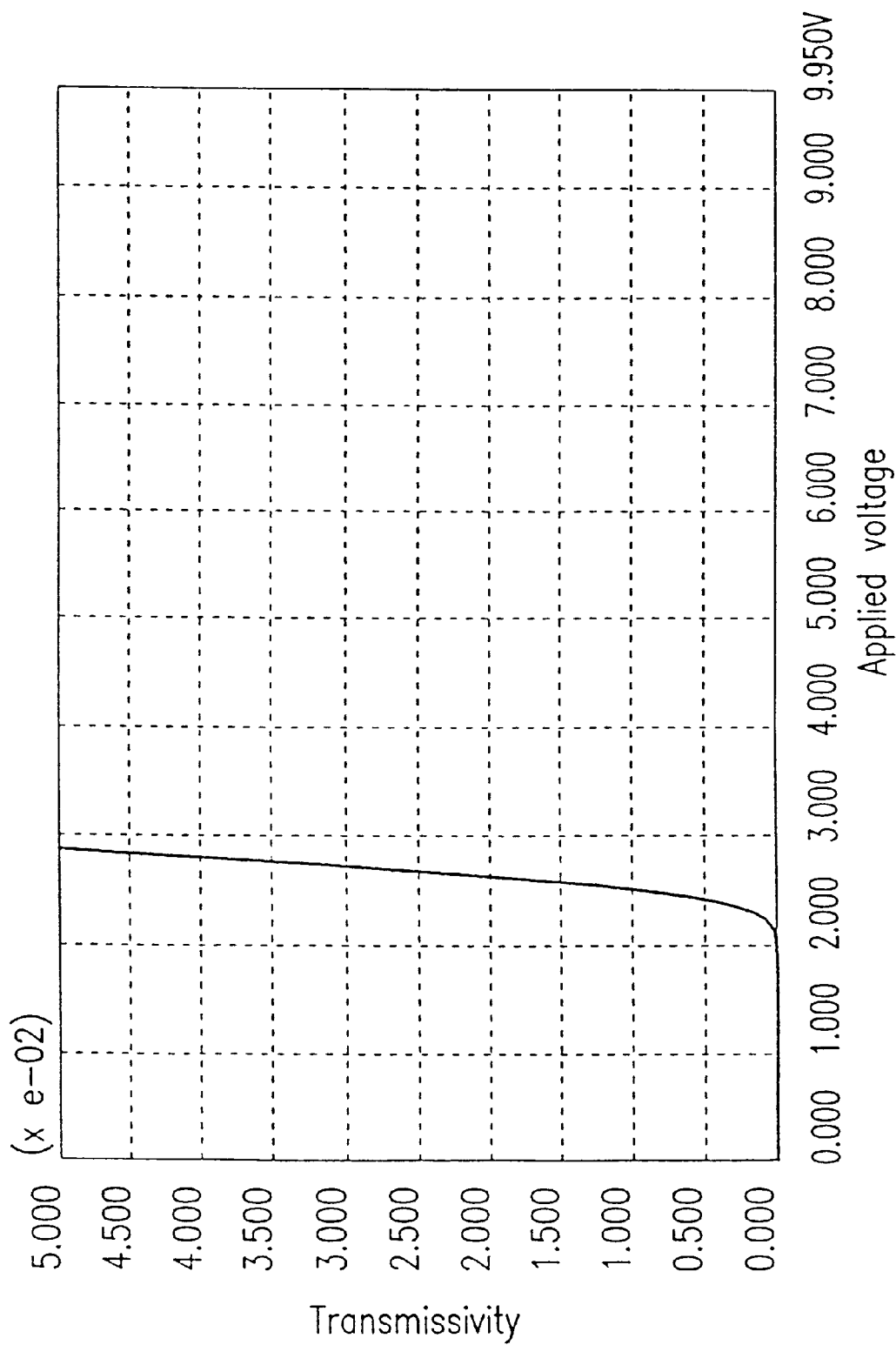
FIG. 19 is a graph showing an applied voltage—transmissivity characteristic of the liquid crystal display device of Embodiment 5 in the vicinity of a threshold value.
Figure 20:
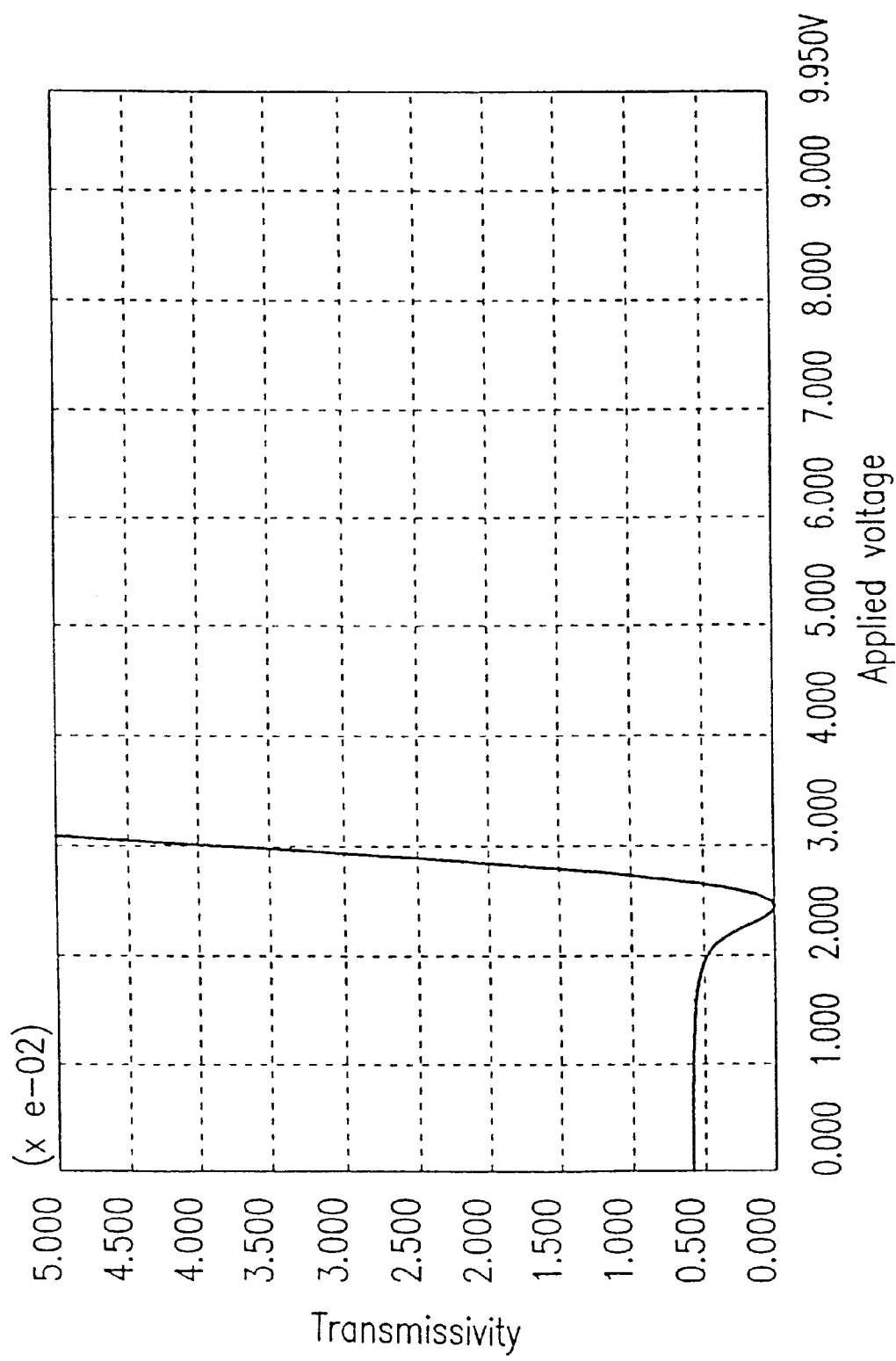
FIG. 20 is a graph showing the applied voltage—transmissivity characteristic of the liquid crystal display device of Embodiment 4 in the vicinity of a threshold value.

The graph in FIG. 19 shows a voltage-transmissivity curve of the liquid crystal display device 6 of the present embodiment. For comparison, the graph in FIG. 20 shows a voltage-transmissivity curve of the liquid crystal display device 5 described in Embodiment 4. It is noted that the transmissivity is observed in a direction vertical to the display surface, wherein the polar viewing angle is 0°. In these graphs, the vicinity of a transmissivity of 0% is enlarged.

In the voltage-transmissivity curve (FIG. 20) of the liquid crystal display device 5 of Embodiment 4, a transmissivity of 0% is obtained only at a voltage in the vicinity of a threshold voltage of a liquid crystal material. In contrast, as shown in FIG. 19, in the liquid crystal display device 6 described in the present embodiment, a transmissivity of 0% is obtained in the entire range equal to or lower than the threshold voltage of the liquid crystal material.

Figure 21:
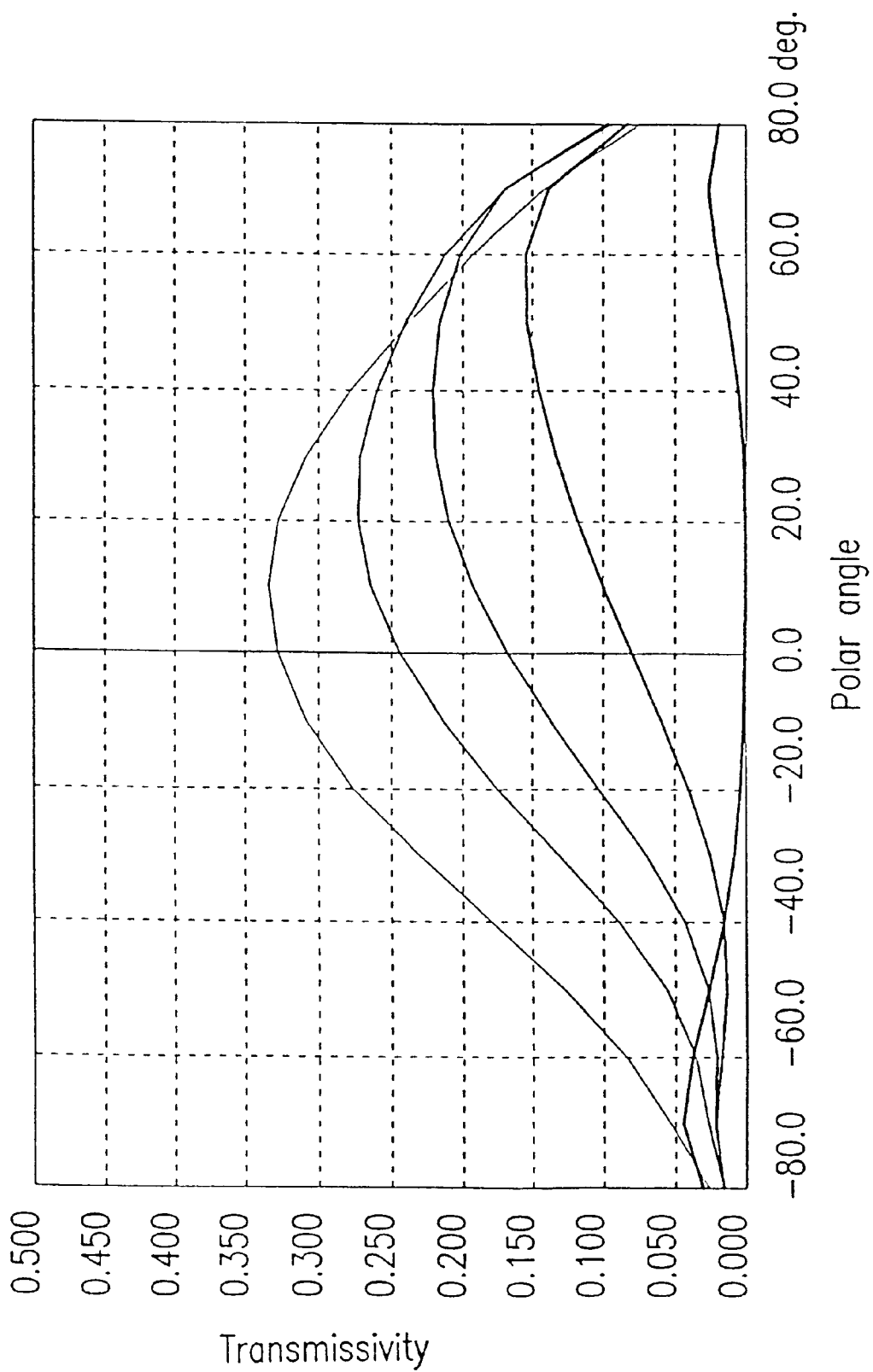
FIG. 21 is a graph showing the gray-scale characteristics of the liquid crystal display device of Embodiment 5 when observed in an up and down direction.
Figure 22:
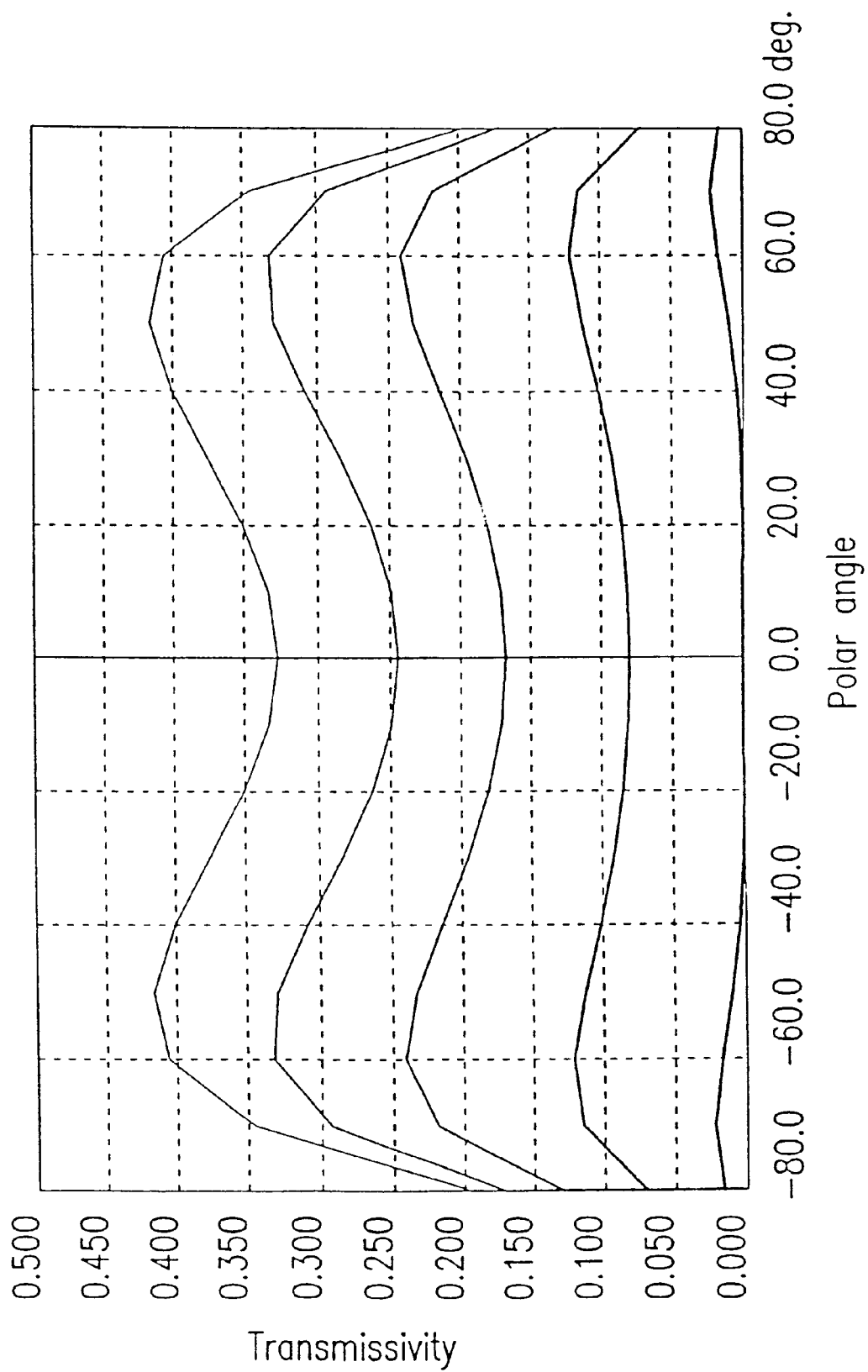
FIG. 22 is a graph showing the gray-scale characteristics of the liquid crystal display device of Embodiment 5 when observed in a right and left direction.

The graph in FIG. 21 shows the gray-scale characteristics of the liquid crystal display device 6 in an up and down direction. The graph in FIG. 22 shows the gray-scale characteristics in a right and left direction. With the liquid crystal display device 6 of the present embodiment, it is confirmed that a gray-scale inversion phenomenon is eliminated in a downward direction.

EMBODIMENT 6

A liquid crystal display device 7 of the present embodiment is provided with phase difference compensation films 706 and 712 having a refractive index which exhibits a uniaxial positive anisotropy in a plane parallel to the surface of a liquid crystal cell 14. Therefore, the increase in transmissivity when the liquid crystal display device 7 is in a black display state and observed in an oblique direction is suppressed, as a result of which the contrast viewing angle characteristics are improved.

Figure 23A:
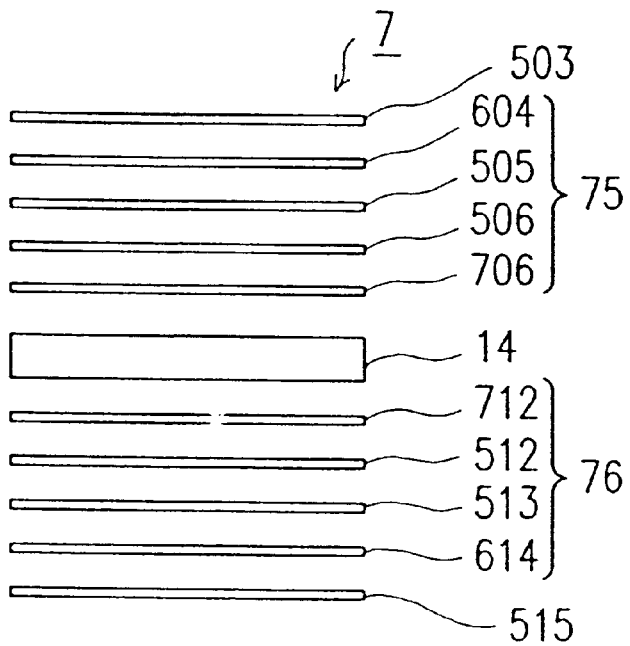
FIG. 23A is a cross-sectional view of a liquid crystal display device of Embodiment 6 according to the present invention, showing an exemplary layered structure of polarizers, phase difference compensation elements, and a liquid crystal cell.

The liquid crystal display device 7 shown in FIG. 23A includes a liquid crystal cell 14, and two phase difference compensation elements 75 and 76 interposing the liquid crystal cell 14 therebetween. Furthermore, the liquid crystal display device 7 has polarizing plates 503 and 515 positioned on the phase difference compensation elements 75 and 76, respectively.

The phase difference compensation element 75 has a phase difference compensation film 706 between the phase difference compensation film 506 and the liquid crystal cell 14. In this respect, the phase difference compensation element 75 is different from the phase difference compensation element 66 of Embodiment 5. In addition, the phase difference compensation element 76 has a phase difference compensation film 712 between the phase difference compensation film 512 and the liquid crystal cell 14. In this respect, the phase difference compensation element 76 is different from the phase difference compensation element 66 of Embodiment 5. The respective phase difference compensation films of the present embodiment have birefringence.

Figure 23B:
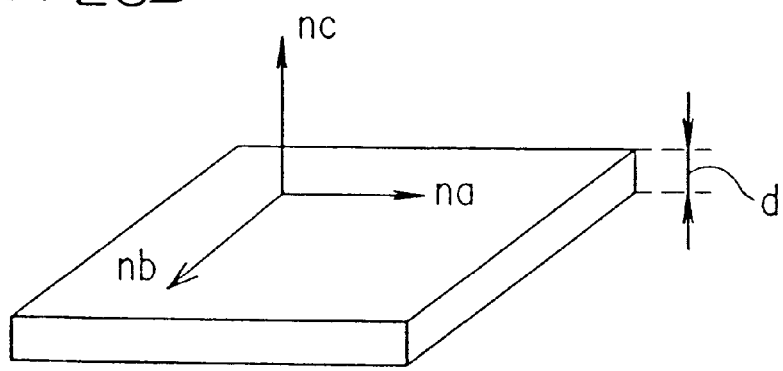
FIG. 23B is a view illustrating anisotropy of a refractive index of the phase difference compensation film of Embodiment 6 shown in FIG. 23A.

FIG. 23B shows the directions of the principal axes of an index ellipsoid (not shown) on the phase difference compensation films 706 and 712. In FIG. 23B, a plane including a principal axis having a refractive index ns and a principal axes having refractive index nb is parallel to the surface of the liquid crystal cell 14. The phase difference compression films 706 and 712 are constructed so that $d \times (nb-ns) = 35$ nm, and $d \times (nb-nc) = 35$ nm Since nb≠ns, in a plane parallel to the surface of the liquid crystal cell 14, the phase difference compensation films 706 and 712 have refractive index anisotropy. However, as described later, the principal axes ns and nb of the index ellipsoid of the phase difference compensation films 706 and 712 are parallel to the absorption axes of the polarizing plates 503 and 515 or orthogonal thereto. Therefore, the transmissivity of the liquid crystal display device 7 while no voltage is being applied to the liquid crystal cell 14 is zero. More specifically, in the present embodiment, the effects of the phase difference compensation films 605 and 613 shown in FIG. 19 in Embodiment 5 are obtained.

Figure 23C:
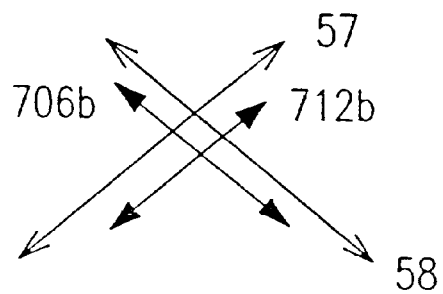
FIG. 23C is a view showing the relationship between the optic axes of the phase difference compensation elements and the absorption axes of the polarizers shown in FIG. 23A.

FIG. 23C shows the relationship between the directions of the principal axes of the phase difference compensation films 706 and 712 and the directions of the absorption axes of the polarizing plates 503 and 515. The direction of a principal axis 706b having a refractive index nb of the phase difference compensation film 706 is orthogonal to the direction of an absorption axis 57 in the polarizing plate 503. Furthermore, the direction of a principal axis 712b having a refractive index nb of the phase difference compensation film 712 is orthogonal to the direction of an absorption axis 58 in the polarizing plate 515. More specifically, the directions of the maximum refractive indices of the phase difference compensation films 706 and 712 are orthogonal to the absorption axes of the polarizing plates adjacent to the respective phase difference compensation elements.

Figure 24:
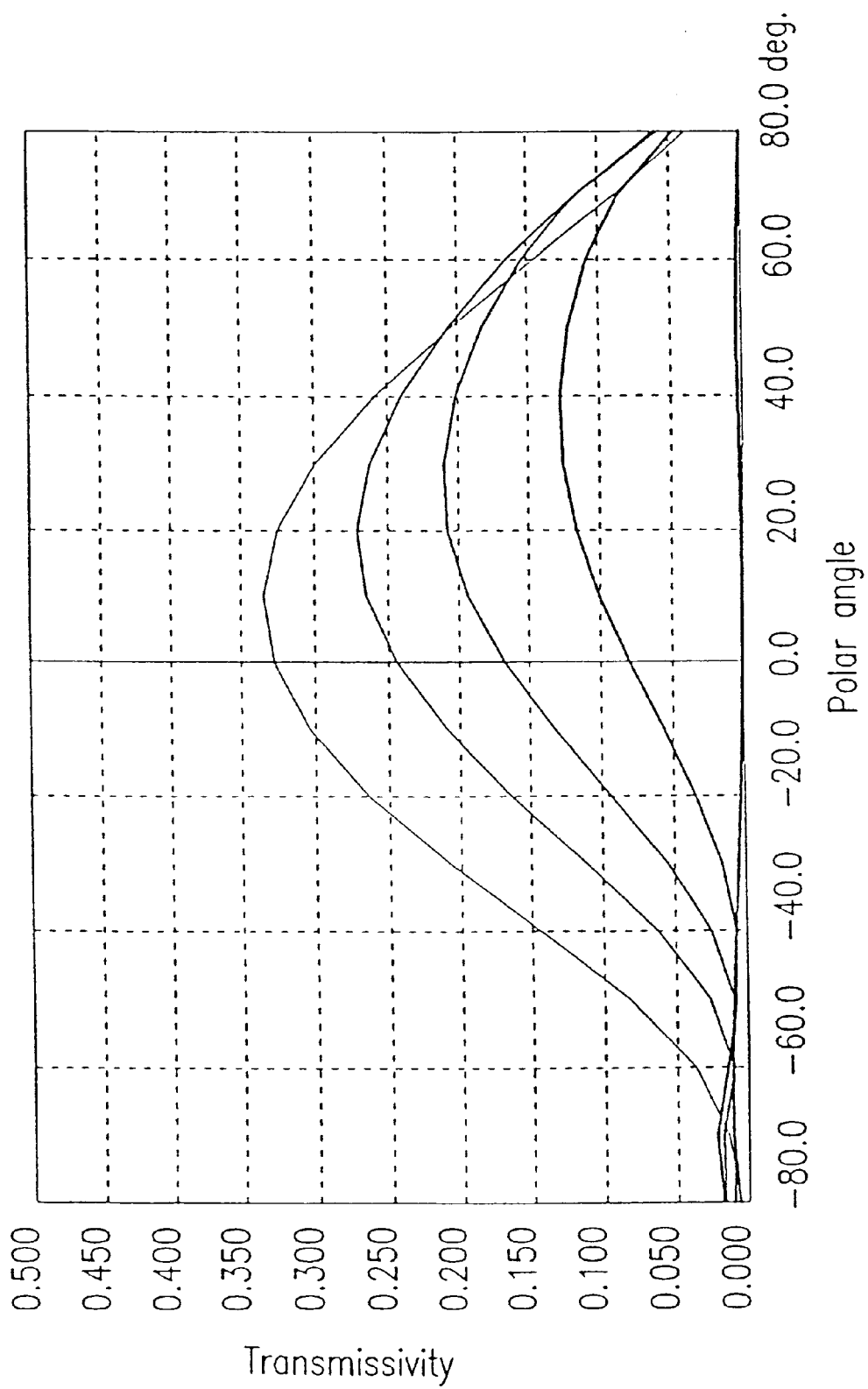
FIG. 24 is a graph showing the gray-scale characteristics of the liquid crystal display device of Embodiment 6 when observed in an up and down direction.
Figure 25:
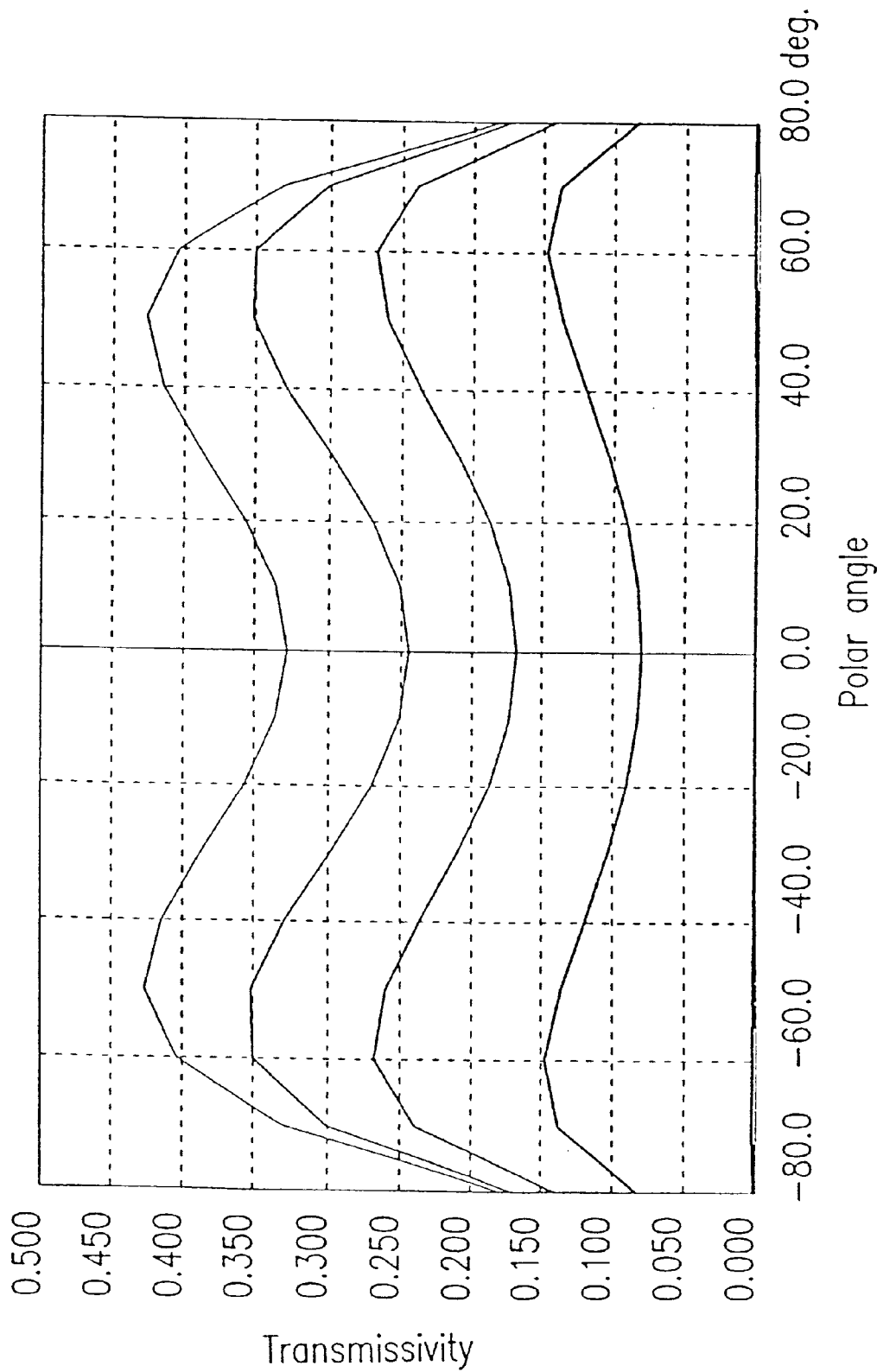
FIG. 25 is a graph showing the gray-scale characteristics of the liquid crystal display device of Embodiment 6 when observed in a right and left direction.

The graph in FIG. 24 shows the gray-scale characteristics of the liquid crystal display device 7 in an up and down direction. The graph in FIG. 25 shows the gray-scale characteristics in a right and left direction. It is confirmed from FIG. 24 that with the liquid crystal display device 7 of the present embodiment, a gray-scale inversion phenomenon is eliminated in a downward direction. Furthermore, it is confirmed from FIGS. 24 and 25 that when the liquid crystal display device 7 is in a black display state and is tilted in an up and down direction or in a right and left direction, the increase in transmissivity can be remarkably suppressed, compared with Embodiment 2. That is, the contrast viewing angle characteristics are remarkably improved.

In the present embodiment, it is assumed in the phase difference compensation films 706 and 712 that $d \times (nb-na) = 35$ nm end $d \times (nb-nc) = 35$ nm. However, the present embodiment is not limited thereto. The following relationships 0 nm<$d \times (nb-na)$<70 nm and 0 nm<$d \times (nb-nc)$<70 nm should be satisfied.

In the present embodiment, in the phase difference compensation element 75, the phase difference compensation films 706, 506, 505, and 605 are formed in this order adjacent to the liquid crystal cell 14. However, the order of the formed layers are not limited thereto, provided that the phase difference compensation film 706 should be placed closer to the liquid crystal cell 14 then the phase difference compensation film 506. The same holds true for the phase difference compensation element 76.

In the present embodiment, the phase difference compensation films with the same characteristics are placed on both sides of the liquid crystal cell 14. However, by appropriately adjusting the retardation value of each phase difference compensation film, the phase difference compensation film may be provided only on one side of the liquid crystal cell 14.

In the present embodiment, the phase difference compensation films 506 and 706 respectively have uniaxial anisotropy of a refractive index. However, these phase difference compensation films 506 and 706 may be replaced by one phase difference compensation film having biaxial anisotropy of a refractive index. The same holds true for the phase difference compensation films 506 and 605.

As described above, according to the present invention, in the case of using a liquid crystal cell provided with a homeotropic alignment film and an N-type nematic liquid crystal, a liquid crystal display device with a large viewing angle region in which a grey scale inversion phenomenon does not occur can be provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:

a liquid crystal cell including homeotropic alignment films which are provided on substrates interposing an N-type nematic liquid crystal layer on the liquid crystal layer side;

a pair of polarizing plates provided so as to interpose the liquid crystal cell; and a phase difference compensation element provided between at least one of the pair of polarizing plates and the liquid crystal cell;

wherein one principal axis of three principal axes of an index ellipsoid of the phase difference compensation element is inclined from a normal to a surface of the liquid crystal cell, and a refractive index along said one principal axis is smaller than refractive indices along the other principal axes; and wherein the phase difference compensation element comprises a plurality of layered phase difference compensation films each having an optic axis at a different polar angle, and an aggregate optic axis of the layered phase difference compensation films is inclined from the normal to the surface of the phase difference compensation element.

2. A liquid crystal display device, comprising:

a liquid crystal cell including homeotropic alignment films which are provided on substrates interposing an N-type nematic liquid crystal layer on the liquid crystal layer side;

a pair of polarizing plates provided so as to interpose the liquid crystal cell; and a phase difference compensation element provided between at least one of the pair of polarizing plates and the liquid crystal cell;

wherein one principal axis of three principal axes of an index ellipsoid of the phase difference compensation element is inclined from a normal to a surface of the liquid crystal cell, and a refractive index along said one principal axis is smaller than refractive indices along the other principal axes; and wherein the phase difference compensation element is composed of layered phase difference compensation films including a plurality of phase difference compensation films each having an optic axis at a different polar angle and different azimuths with respect to said optic axes, and an aggregate optic axis of the layered phase difference compensation films is inclined form the normal to the surface of the phase difference compensation element.

3. A liquid crystal display device, comprising:

a liquid crystal cell including homeotropic alignment films which are provided on substrates interposing an N-type nematic liquid crystal layer on the liquid crystal layer side;

a pair of polarizing plates provided so as to interpose the liquid crystal cell; and a phase difference compensation element provided between at least one of the pair of polarizing plates and the liquid crystal cell;

wherein one principal axis of three principal axes of an index ellipsoid of the phase difference compensation element is inclined from a normal to a surface of the liquid crystal cell, and a refractive index along said one principal axis; and further comprising a second phase difference compensation element between at least one of the pair of polarizing plates and the liquid crystal cell;

wherein said two principal axes of three principal axes of an index ellipsoid of the second phase difference compensation element are within a plane parallel to the surface of the liquid crystal cell;

the respective magnitudes of refractive indices along said two principal axes are different from each other, and the direction of the principal axis having a larger refractive index of said two principal axes is orthogonal to a direction of an absorption axis of an adjacent polarizing plate.

4. A liquid crystal display device according to claim 3, wherein the third phase difference compensation element includes at least one phase difference compensation film.

5. A liquid crystal display device, comprising:

a liquid crystal cell including homeotropic alignment films which are provided on substrates interposing an N-type nematic liquid crystal layer on the liquid crystal layer side;

a pair of polarizing plates provided so as to interpose the liquid crystal cell; and a phase difference compensation element provided between at least one of the pair of polarizing plates and the liquid crystal cell;

wherein one principal axis of three principal axes of an index ellipsoid of the phase difference compensation element is inclined from a normal to a surface of the liquid crystal cell, and a refractive index along said one principal axis is smaller than refractive indices along the other principal axes; and wherein the phase different compensation element comprises a plurality of layered phase difference compensation films having different azimuths with respect to optic axes of the layered phase compensation films, and an aggregate optic axis of the layered phase difference compensation films is inclined from the normal to the surface of the phase difference compensation element.

* * * * *